(12) United States Patent
Kawaguchi et al.

(10) Patent No.: US 11,060,544 B2
(45) Date of Patent: Jul. 13, 2021

(54) FASTENERS

(71) Applicant: DAIWA KASEI KOGYO KABUSHIKI KAISHA, Okazaki (JP)

(72) Inventors: Hideyuki Kawaguchi, Okazaki (JP); Naohiro Sawada, Okazaki (JP)

(73) Assignee: DAIWA KASEI KOGYO KABUSHIKI KAISHA, Okazaki (JP)

( * ) Notice: Subject to any disclaimer, the term of this patent is extended or adjusted under 35 U.S.C. 154(b) by 0 days.

(21) Appl. No.: 16/723,640

(22) Filed: Dec. 20, 2019

(65) Prior Publication Data

US 2020/0200204 A1 Jun. 25, 2020

(30) Foreign Application Priority Data

Dec. 21, 2018 (JP) .............................. JP2018-239504
Oct. 3, 2019 (JP) .............................. JP2019-183011

(51) Int. Cl.
| | |
|---|---|
| *F16B 21/08* | (2006.01) |
| *B60R 13/02* | (2006.01) |
| *H02G 3/32* | (2006.01) |
| *F16B 5/06* | (2006.01) |
| *B60R 16/02* | (2006.01) |

(52) U.S. Cl.
CPC .......... *F16B 21/086* (2013.01); *F16B 21/088* (2013.01); *B60R 13/0206* (2013.01); *B60R 16/0215* (2013.01); *F16B 5/065* (2013.01); *H02G 3/32* (2013.01)

(58) Field of Classification Search
CPC ...... F16B 21/086; F16B 21/088; F16B 5/065; B60R 13/0206; B60R 16/0215; B60R 2/0207; H02G 3/32; F16L 3/137; F16L 3/233; F16L 3/24; F16L 3/243; F16L 3/12; F16L 3/08; H01B 7/0045
See application file for complete search history.

(56) References Cited

U.S. PATENT DOCUMENTS

| | | | | |
|---|---|---|---|---|
| 3,889,320 | A | * | 6/1975 | Koscik ................ B60R 13/0206 24/297 |
| 5,505,411 | A | * | 4/1996 | Heaton ...................... F16L 3/04 248/68.1 |
| 5,725,185 | A | * | 3/1998 | Auclair ...................... F16L 3/12 248/73 |
| 5,759,004 | A | * | 6/1998 | Kuffel ................... F16B 21/086 24/295 |

(Continued)

FOREIGN PATENT DOCUMENTS

| | | |
|---|---|---|
| JP | H10-201057 A | 7/1998 |
| JP | 2001-275236 A | 10/2001 |

(Continued)

*Primary Examiner* — Christopher Garft
(74) *Attorney, Agent, or Firm* — Christensen, Fonder, Dardi & Herbert PLLC

(57) ABSTRACT

A fastener may include a plate-shaped connecting base, at least one pair of projecting portions respectively formed in the connecting base, and undercut portions formed in the at least one pair of projecting portions. The at least one pair of projecting portions oppositely project in a lateral direction of the connecting base. The at least one pair of projecting portions respectively have first surfaces sloped toward distal ends thereof. The undercut portions are defined by the first surfaces of the at least one pair of projecting portions.

12 Claims, 29 Drawing Sheets

(56) References Cited

U.S. PATENT DOCUMENTS

| | | | | |
|---|---|---|---|---|
| 6,076,781 A * | 6/2000 | Kraus | ................ | B60R 16/0215 |
| | | | | 248/73 |
| 8,177,173 B2 * | 5/2012 | Spiess | ...................... | F16L 3/04 |
| | | | | 248/71 |
| 8,533,919 B2 * | 9/2013 | Schliessner | ........... | F16B 21/084 |
| | | | | 24/458 |
| 2003/0159256 A1 * | 8/2003 | Clarke | ................ | F16B 21/084 |
| | | | | 24/297 |
| 2005/0150087 A1 * | 7/2005 | Lydan | .................... | B60R 13/04 |
| | | | | 24/297 |
| 2011/0272547 A1 * | 11/2011 | Gotou | ................ | B60R 16/0215 |
| | | | | 248/224.8 |
| 2018/0339665 A1 * | 11/2018 | Diep | ........................ | F16B 2/22 |

FOREIGN PATENT DOCUMENTS

| | | |
|---|---|---|
| JP | 2002-364779 A | 12/2002 |
| JP | 3467687 B2 | 11/2003 |
| JP | 2012-217289 A | 11/2012 |

* cited by examiner

FASTENERS

CROSS-REFERENCE TO RELATED APPLICATIONS

This application claims priority to Japanese Patent Applications serial numbers 2018-239504 filed Dec. 21, 2018 and 2019-183011 filed Oct. 3, 2019, the contents of which are incorporated herein by reference.

BACKGROUND

The present disclosure relates to clamps or fasteners for attaching cabling members (e.g., wiring harnesses) to object members (e.g. vehicle body panels). More particularly, the present disclosure relates to fasteners having connecting bases configured to be fixed to the cabling members and anchors configured to be connected to the object members.

A known fastener for attaching a wiring harness (a cabling member) to a vehicle body panel is taught by, for example, JP 2002-364779 A. The known fastener is a so-called taping-type fastener that is configured to be connected to the wiring harness using adhesive tapes (band-like members). As shown in FIGS. 28 to 30, the fastener 601 includes a connecting base 602 configured to be fixed to the wiring harness 640, and an anchor 603 formed in the connecting base 602 so as to be configured to be secured to the vehicle body panel. The connecting base 602 has a first surface 621 to contact the wiring harness 640 and a second surface 622 to be wrapped with the adhesive tapes 650 therearound. Further, the connecting base 602 has a pair of tape stopper ribs 624 respectively formed in the second surface 622 and positioned at longitudinal end peripheries of the connecting base 602.

In order to attach the wiring harness 640 to the vehicle body panel, the connecting base 602 of the fastener 601 is applied to the wiring harness 640 with the first surface 621 brought into contact with an outer circumferential surface of the wiring harness 640. Thereafter, the adhesive tapes 650 are wrapped around the second surface 622 of the connecting base 602 and the outer circumferential surface of the wiring harness 640, so that the connecting base 602 is fixed to the wiring harness 640. Further, as shown in FIG. 29, the adhesive tapes 650 are wrapped such that outer edges 651 thereof are respectively positioned adjacent to the tape stopper ribs 624. Thus, the fastener 601 is connected in place to the wiring harness 640. Subsequently, the anchor 603 of the fastener 601 connected to the wiring harness 640 is secured to the vehicle body panel, so that the fastener 601 is attached to the vehicle body panel. Thus, the wiring harness 640 is attached to the vehicle body panel via the fastener 601.

According to the fastener 601 thus constructed, because the connecting base 602 has the tape stopper ribs 624, when a longitudinal displacement force is produced between the fastener 601 and the wiring harness 640 during work, the outer edge 651 of one of the adhesive tapes 650 wrapped around the second surface 622 of the connecting base 602 may engage one of the tape stopper ribs 624. As a result, even when the longitudinal displacement force is produced between the fastener 601 and the wiring harness 640, a relative longitudinal displacement between the fastener 601 and the wiring harness 640 may substantially be avoided (FIG. 29).

However, when an excessively large longitudinal displacement force is produced between the fastener 601 and the wiring harness 640, even if the outer edge 651 of one of the adhesive tapes 650 engages one of the tape stopper ribs 624, the outer edge 651 of one of the adhesive tapes 650 may be easily disengaged from one of the tape stopper ribs 624. As a result, one of the adhesive tapes 650 may pass over one of the tape stopper ribs 624 (FIG. 30). This may result in an excessive relative longitudinal displacement of the fastener 601 and the wiring harness 640. Therefore, in order to prevent the excessive relative longitudinal displacement of the fastener 601 and the wiring harness 640, the adhesive tapes 650 must be wrapped around the connecting base 602 and the wiring harness 640 with a large wrapping force.

Therefore, there is a need in the art for an improved fastener.

SUMMARY

In one aspect of the present disclosure, a fastener may include a plate-shaped connecting base, at least one pair of projecting portions respectively formed in the connecting base, and undercut portions formed in the at least one pair of projecting portions. The at least one pair of projecting portions oppositely project in a lateral direction of the connecting base. The at least one pair of projecting portions respectively have first surfaces sloped toward distal ends thereof. The undercut portions are defined by the first surfaces of the at least one pair of projecting portions.

In order to connect the fastener to a cabling member, the connecting base of the fastener may be applied to the cabling member. Thereafter, band-like members may be wrapped around the connecting base of the fastener and the cabling member, so as to fix the connecting base to the cabling member. Further, the band-like members may be wrapped so as to completely cover the at least one pair of projecting portions formed in the connecting base. Thus, the fastener may be connected to the cabling member.

According to the fastener of this aspect, when a large lateral displacement force is produced between the fastener and the cabling member, the fastener may be slid along the cabling member, so that one of the band-like members covering one of the at least one pair of projecting portions may be folded around the distal end of one of the at least one pair of projecting portions in the lateral direction of the connecting base. As a result, the folded one of the band-like members may be partially caught in the undercut portion formed in one of the projecting portions while the distal end of one of the at least one pair of projecting portions may bite into one of the band-like members. As a result, the fastener may be effectively restricted from being excessively slid along the cabling member. Thus, the relative lateral displacement of the fastener and the cabling member may be effectively minimized even when such a large lateral displacement force is produced between the fastener and the cabling member.

Additional objects, features and advantages of the present disclosure will be readily understood after reading the following detailed description together with the accompanying drawings and the claims.

DETAILED DESCRIPTION

Figure 1:
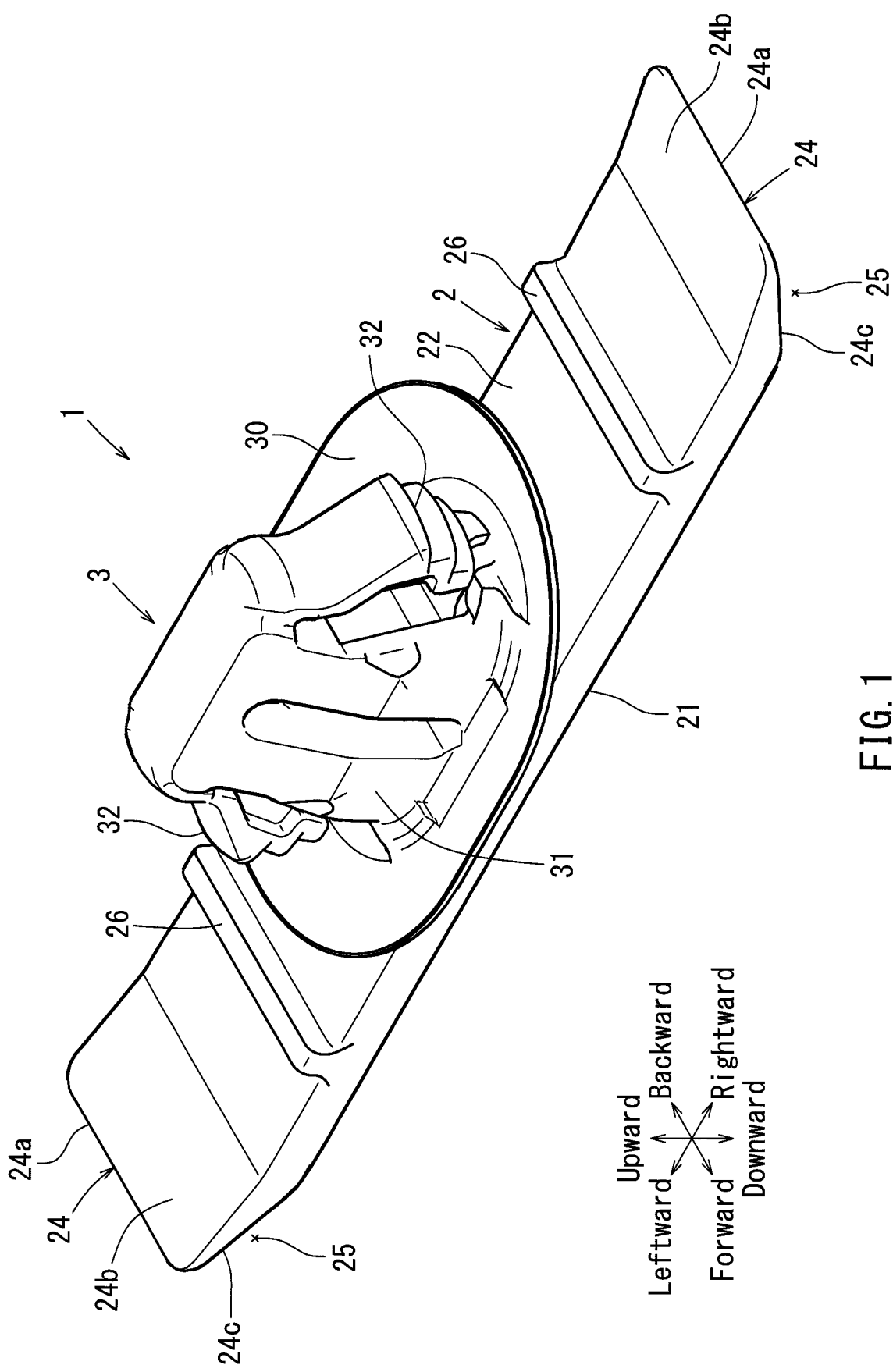
FIG. 1 is a perspective view of a fastener according to a first representative embodiment of the present disclosure, which is viewed from above.
Figure 2:
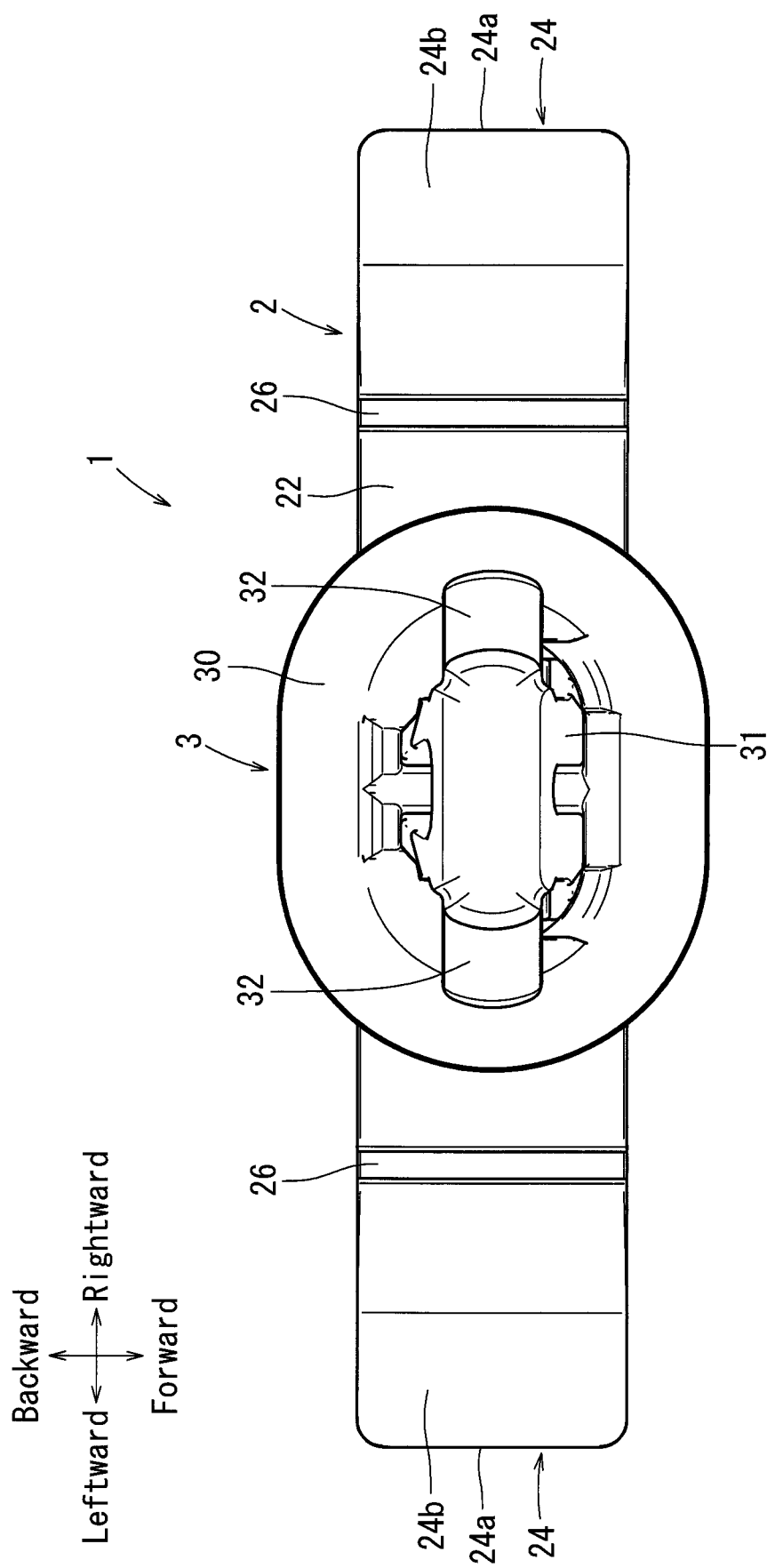
FIG. 2 is a plan view of the fastener.

Detailed representative embodiments of the present disclosure are shown in FIGS. 1 to 27.

First Embodiment

In the following, a first embodiment of the present disclosure will be described in detail with reference to FIGS. 1 to 6.

As shown in FIGS. 1 to 4, a taping-type fastener 1 (which may be hereinafter simply referred to as a fastener 1) may include a connecting base 2 configured to be applied or connected to a wiring harness 40 (a cabling member) (FIGS. 5 and 6), and an anchor 3 formed in the connecting base 2 and having a base portion 34. The anchor 3 may be configured to be held in an attaching hole (not shown) formed in a vehicle body panel (not shown), so as to be secured to the vehicle body panel. Further, the fastener 1 may preferably be formed as an integral part, for example by molding a hard synthetic resin, e.g., polyethylene.

The connecting base 2 may preferably be formed as a substantially rectangular flat plate shaped member. The connecting base 2 may have a lower or wiring harness contacting surface 21 (which may be simply referred to as a first surface 21) which may be brought into contact with the wiring harness 40, and an upper or tape wrapping surface 22 (which may be simply referred to as a second surface 22) which may be wrapped with adhesive tapes 50 (band-like members) therearound. Further, the anchor 3 may be formed in the second surface 22 of the connecting base 2.

Figure 3:
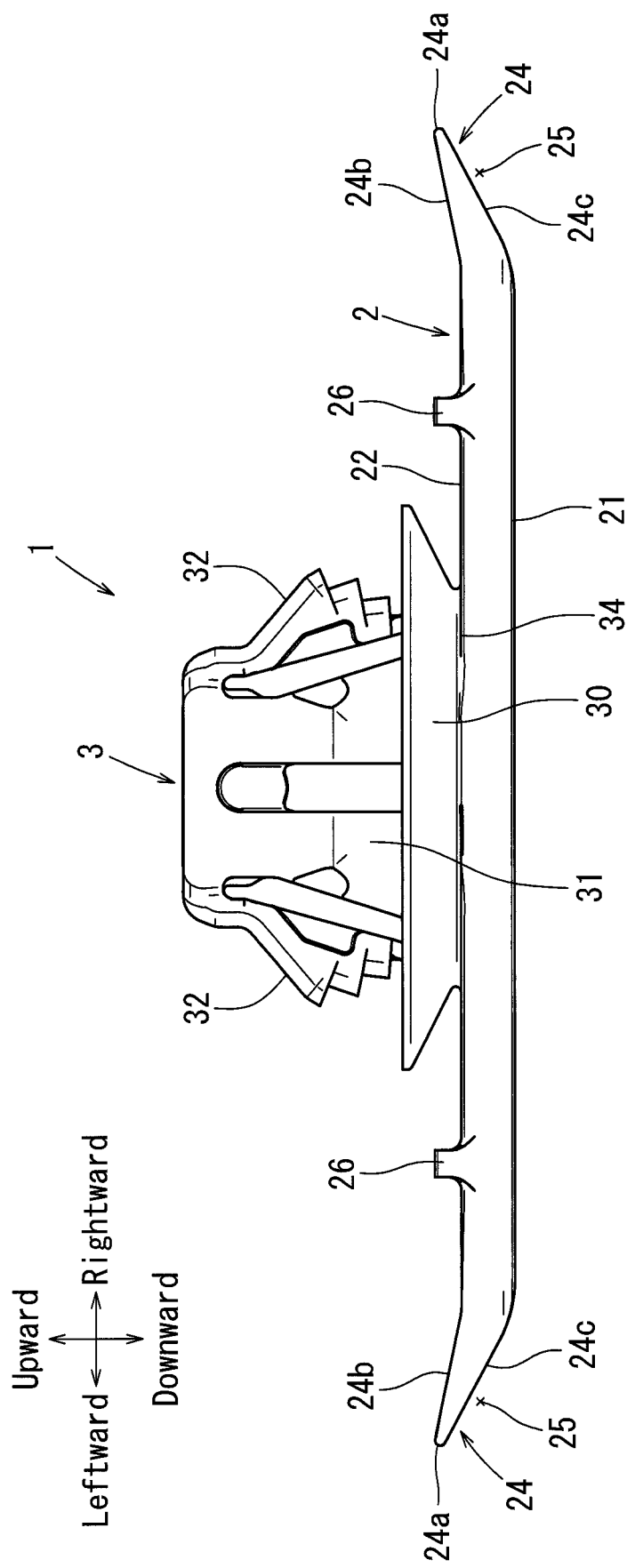
FIG. 3 is an elevational view of the fastener.
Figure 4:
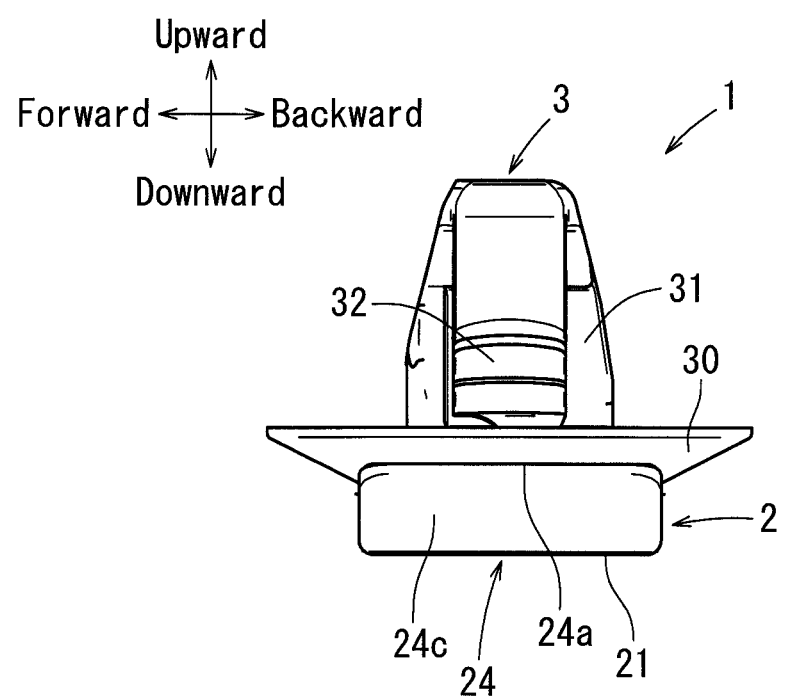
FIG. 4 is a side view of the fastener.

The connecting base 2 may have a pair of rectangular wedge-shaped or tapered (first) projecting portions 24 formed in longitudinal or lateral (right and left) end peripheries thereof and extending in a width direction thereof. The tapered projecting portions 24 may extend over the entire width of the connecting base 2. In other words, the lateral end peripheries of the connecting base 2 may respectively be formed into wedge-shaped edges, so that the tapered projecting portions 24 are formed therein. As best shown in FIG. 3, the projecting portions 24 may respectively oppositely project outward in a lateral (longitudinal) direction of the connecting base 2. The projecting portions 24 may also be inclined upward relative to the connecting base 2. Further, as shown in FIG. 1, the projecting portions 24 may respectively be tapered or reduced in thickness upward, so as to have thinned linear distal ends 24a directed upward and extending in a width (front-back) direction of the connecting base 2. In particular, the projecting portions 24 may respectively have rectangular lower (first) surfaces 24c continuous with the first surface 21 of the connecting base 2 and sloped upward toward the distal ends 24a, and rectangular upper (second) surfaces 24b continuous with the second surface 22 of the connecting base 2 and sloped upward toward the distal ends 24a. As a result, the projecting portions 24 may respectively have a pair of cutout or undercut portions 25 (which may be referred to as first undercut portions) formed therein/thereunder and generally defined by the lower surfaces 24c of the projecting portions 24. Further, the undercut portions 25 thus formed may extend over the entire width of the connecting base 2.

Further, as shown in FIG. 1, the connecting base 2 may have a pair of (right and left) ribs 26 respectively formed in the second surface 22 and extending in the width (front-back) direction of the connecting base 2 over the entire width of the connecting base 2. The ribs 26 may preferably be positioned adjacent to the lateral end peripheries of the connecting base 2.

As shown in FIG. 1, the anchor 3 may preferably be positioned on a laterally central portion of the connecting base 2. The anchor 3 may be generally composed of an elastic stabilizer 30 having a flared dish-shape, a pillar 31 and a pair of elastic engagement strips 32. The stabilizer 30 may be configured to elastically deform or flex with respect to the connecting base 2. The pillar 31 may be positioned on a central portion of the stabilizer 30 and may project upward (i.e., in a direction away from the first surface 21) therefrom. The engagement strips 32 may be formed in both (right and left) sides of the pillar 31 in a lateral direction of the connecting base 2. In particular, the engagement strips 32 may preferably be formed as cantilevered strips that are connected to a distal end of the pillar 31.

Figure 5:
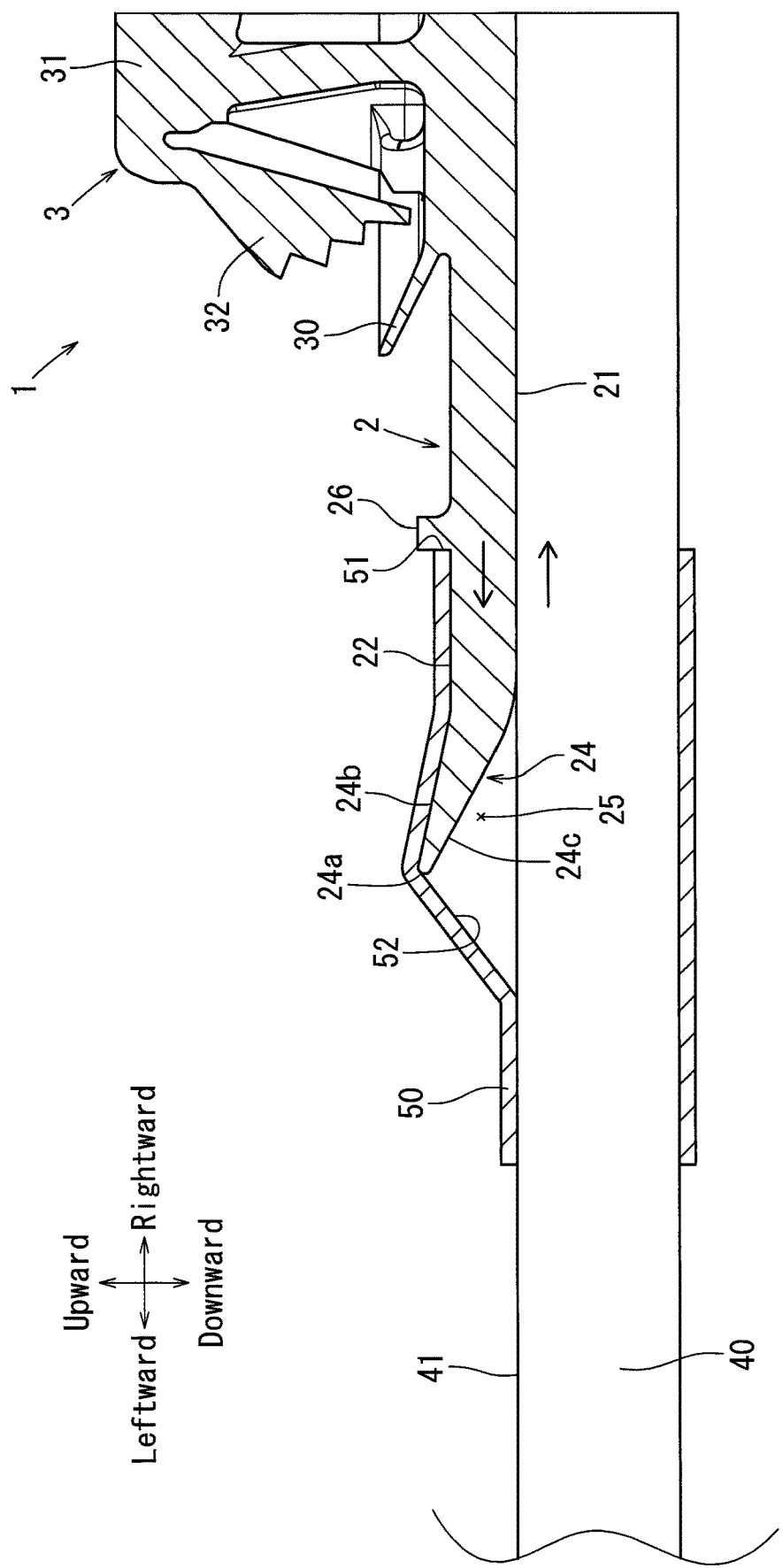
FIG. 5 is a vertical cross-sectional view of the fastener, which illustrates a condition in which the fastener is connected to a wiring harness.

Next, an operation of the fastener 1 thus constructed will be described. In order to attach the wiring harness 40 to the vehicle body panel, for instance as shown in FIG. 5, the connecting base 2 of the fastener 1 may be applied to or set on the wiring harness 40 with the first surface 21 brought into contact with an outer circumferential surface 41 of the wiring harness 40. Thereafter, as shown in FIG. 5, the adhesive tapes 50 (one of which is shown) may be wrapped around both the second surface 22 of the connecting base 2 and the outer circumferential surface 41 of the wiring harness 40, so as to fix the connecting base 2 to the wiring harness 40. Further, as shown in FIG. 5, the adhesive tapes 50 may be wrapped in such a manner that the projecting portions 24 (one of which is shown) formed in the lateral end peripheries of the connecting base 2 may be completely covered by the adhesive tapes 50. In particular, the adhesive tapes 50 may respectively be broadly wrapped beyond the distal ends 24a of the projecting portions 24 so as to enclose or cover the undercut portions 25 formed in the projecting portions 24. In addition, the adhesive tapes 50 may be wrapped such that inner edges 51 of the adhesive tapes 50 are respectively positioned closely adjacent to the corresponding ribs 26. Thus, the fastener 1 may be connected in place to the wiring harness 40.

Subsequently, the pillar 31 constituting the anchor 3 of the fastener 1 connected to the wiring harness 40 may be inserted into the attaching hole formed in the vehicle body panel until the engagement strips 32 formed in the pillar 31 engage the attaching hole with the stabilizer 30 contacting the vehicle body panel. As a result, the pillar 31 may be connected to the attaching hole via the engagement strips 32, so that the anchor 3 is secured to the vehicle body panel. That is, the fastener 1 is attached to the vehicle body panel. Thus, the wiring harness 40 is attached to the vehicle body panel via the fastener 1.

According to the fastener 1 thus constructed, the adhesive tapes 50 may be wrapped in such a manner that the projecting portions 24 formed in the lateral end peripheries of the connecting base 2 may be completely covered by the adhesive tapes 50. Therefore, the fastener 1 may be securely and stably connected to the wiring harness 40. As a result, even when a substantial lateral displacement force is produced between the fastener 1 (the connecting base 2) and the wiring harness 40 during work, e.g., even when the substantial lateral displacement force is applied to the fastener 1 leftward relative to the wiring harness 40, a relative lateral displacement of the fastener 1 and the wiring harness 40 may substantially be avoided (FIG. 5).

Figure 6:
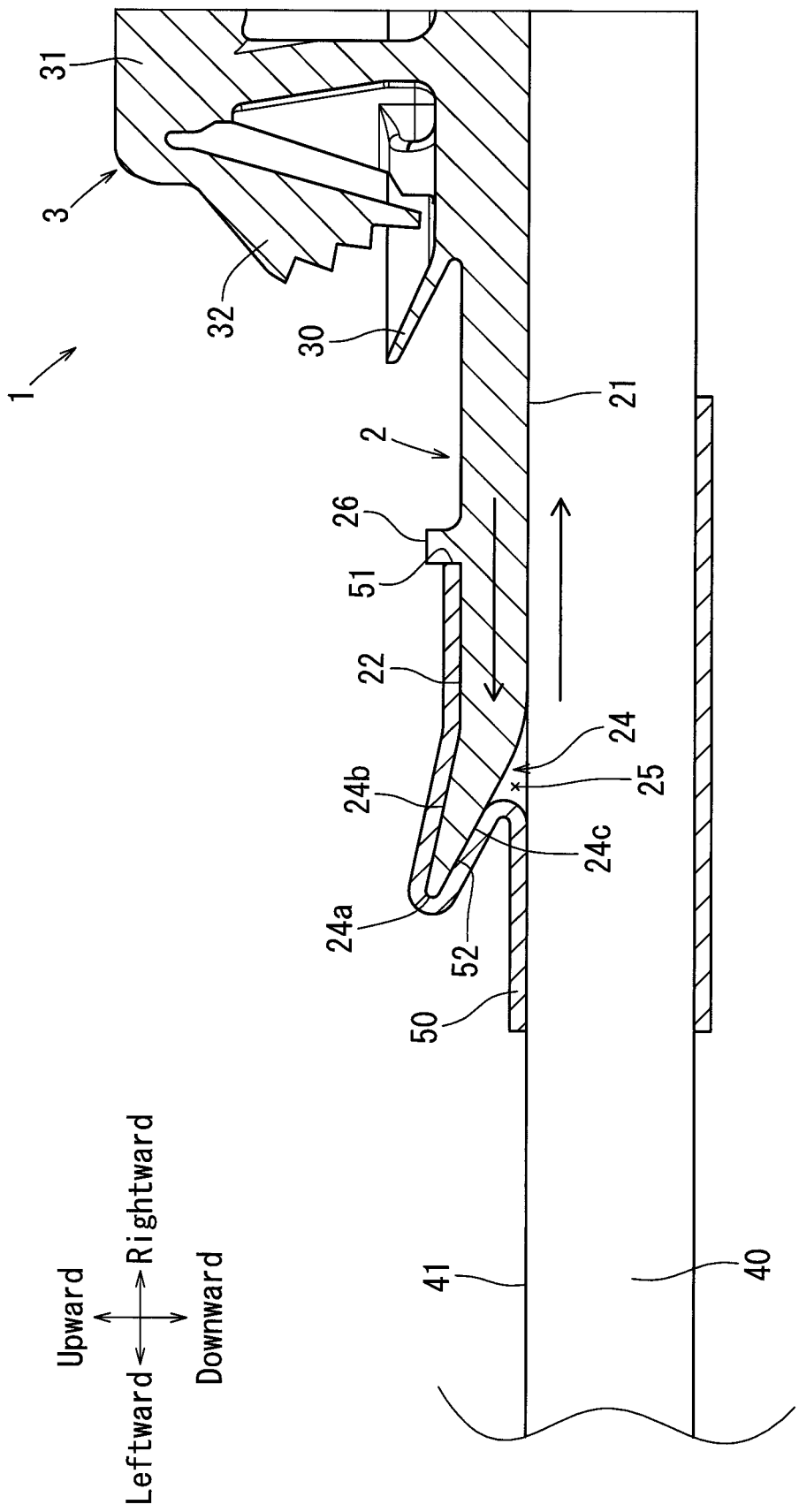
FIG. 6 is a vertical cross-sectional view of the fastener, which illustrates a condition in which a lateral displacement force is produced between the fastener and the wiring harness.

Conversely, as shown in FIG. 6, when an excessively large lateral displacement force is produced between the fastener 1 and the wiring harness 40 during work, e.g., when the excessively large lateral displacement force is applied to the fastener 1 leftward relative to the wiring harness 40, the fastener 1 may be slid leftward along the wiring harness 40. This causes the left adhesive tape 50 covering the left projecting portion 24 (one of the projecting portions 24) to be folded rightward around the distal end 24a of the left projecting portion 24. As a result, the folded left adhesive tape 50 may be partially caught in the undercut portion 25 formed in the left projecting portion 24 while the distal end 24a of the left projecting portion 24 may bite into the left adhesive tape 50. At the same time, an inner (adhesive) surface 52 of the left adhesive tape 50 caught in the undercut portion 25 may adhere to the lower surface 24c of the left projecting portion 24. As a result, the fastener 1 may be effectively restricted from being excessively slid leftward along the wiring harness 40. Thus, the relative lateral displacement of the fastener 1 and the wiring harness 40 may be effectively minimized, even when the excessively large lateral displacement force is produced between the fastener 1 and the wiring harness 40. This means that the adhesive tapes 50 need not be wrapped around the connecting base 2 and the wiring harness 40 with a large force in order to reduce the relative lateral displacement of the fastener 1 and the wiring harness 40 when the large lateral displacement force is produced between the fastener 1 and the wiring harness 40.

Further, according to the fastener 1, the adhesive tapes 50 may simply be wrapped in such a manner that the projecting portions 24 formed in the lateral end peripheries of the connecting base 2 may be completely covered by the adhesive tapes 50. Therefore, there is no need to provide special wrapping spaces for the adhesive tapes 50 on the second surface 22 of the connecting base 2. As a result, the connecting base 2 may be reduced in length.

Further, the projecting portions 24 may respectively be inclined upward such that the distal ends 24a may project upward. Therefore, when the excessively large lateral displacement force is produced between the fastener 1 and the wiring harness 40, the distal ends 24a of the projecting portions 24 may respectively easily and quickly bite into the adhesive tapes 50 covering the projecting portions 24. As a result, the lateral relative displacement of the fastener 1 and the wiring harness 40 may be effectively restricted.

Second Embodiment

A second detailed representative embodiment will now be described with reference to FIGS. 7 to 10. Further, because the second embodiment relates to the first embodiment, only the constructions and elements that are different from the first embodiment will be explained in detail. Elements that are substantially the same in the first and second embodiments will be identified by the same reference numerals and a detailed description of such elements may be omitted.

In this embodiment, similar to the first embodiment, a fastener 101 may include the connecting base 2 and the anchor 3. However, unlike the first embodiment, the connecting base 2 of the fastener 101 may additionally have a pair of rectangular wedge-shaped or tapered opposite (second) projecting portions 27 formed in the second surface 22 and extending in the width direction of the connecting base 2.

Figure 7:
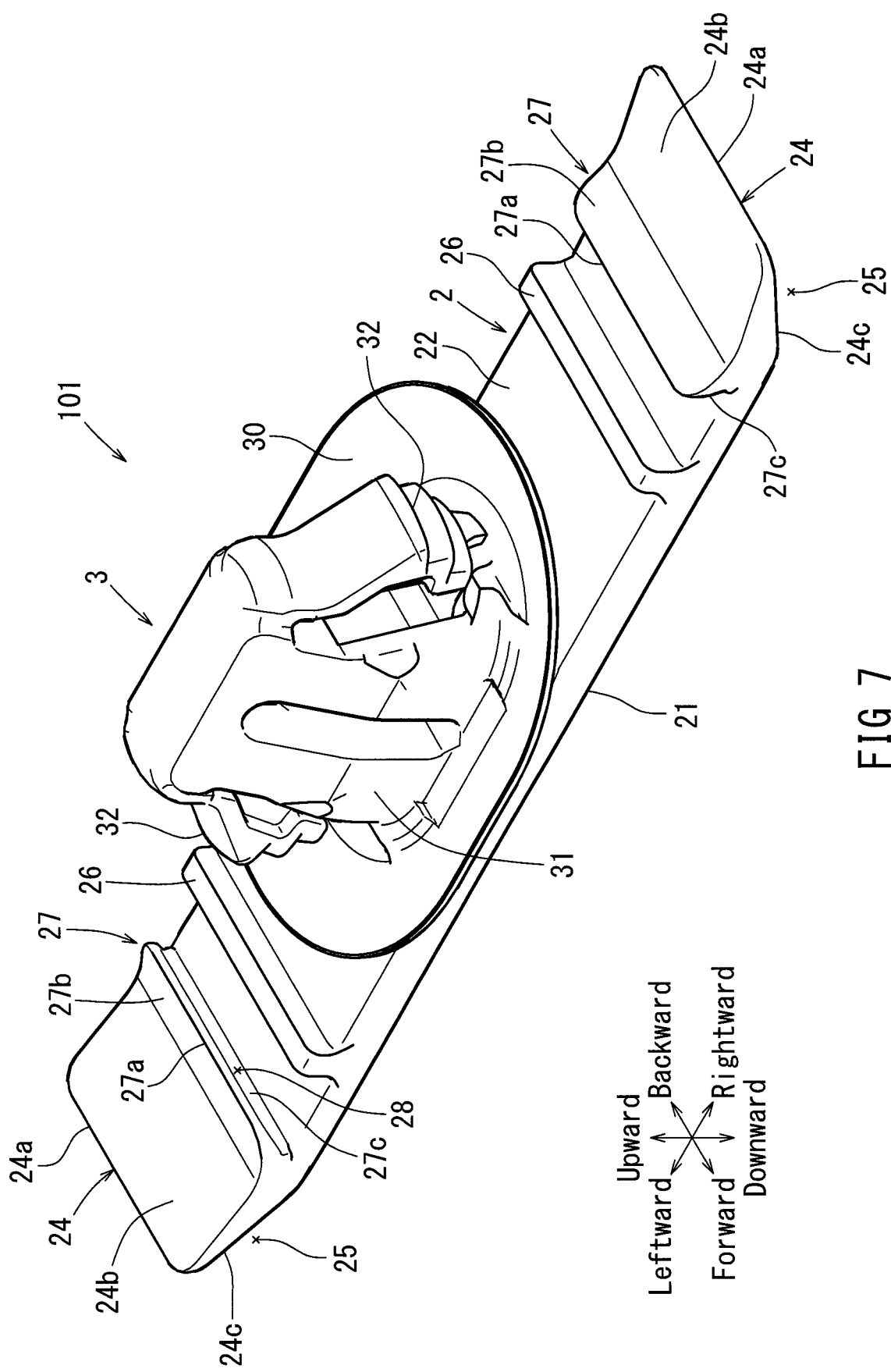
FIG. 7 is a perspective view of a fastener according to a second representative embodiment of the present disclosure, which is viewed from above.
Figure 8:
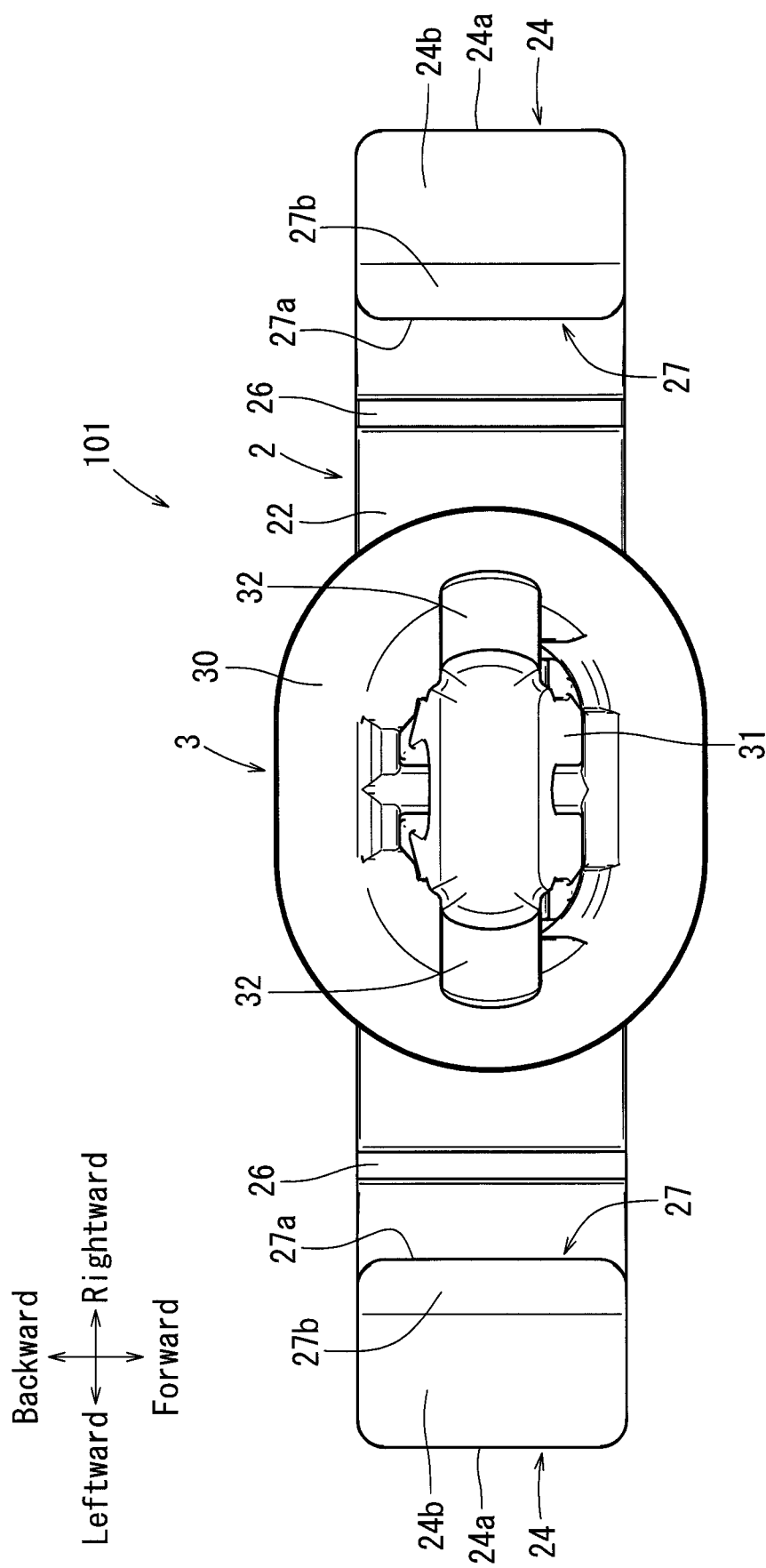
FIG. 8 is a plan view of the fastener.
Figure 9:
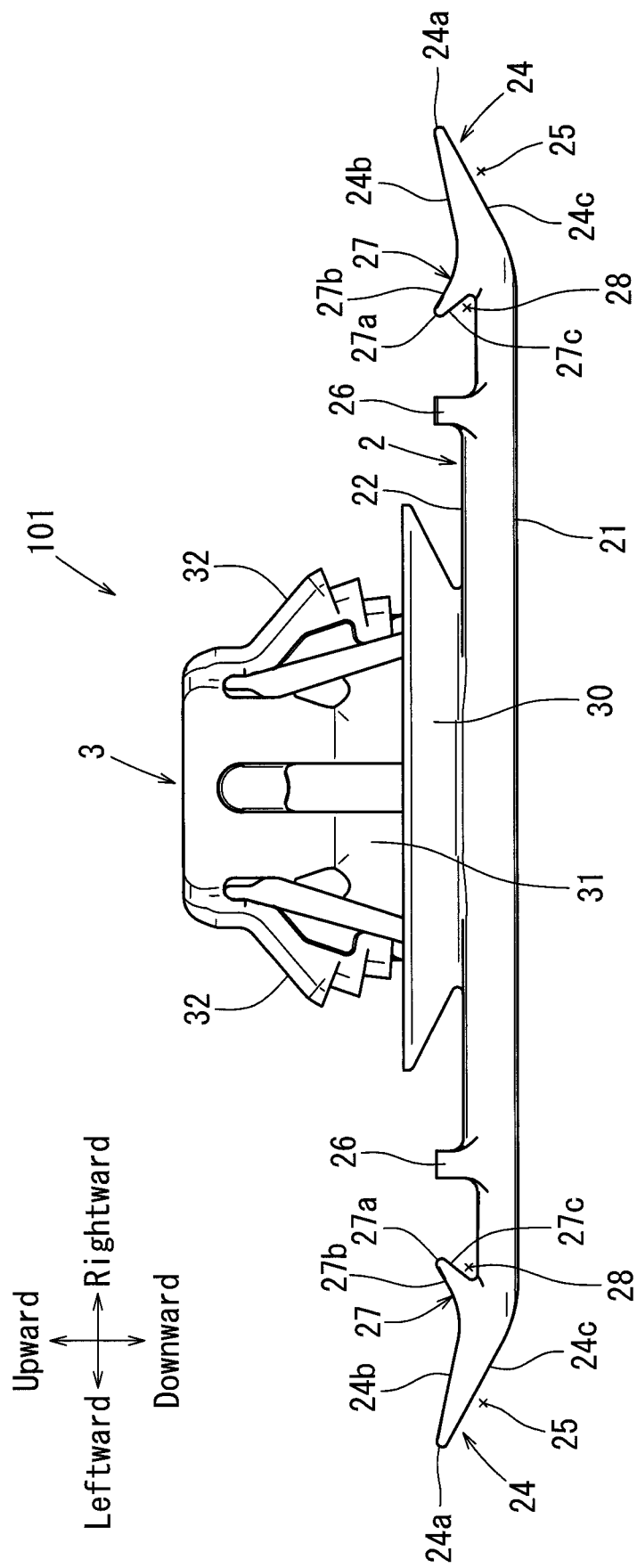
FIG. 9 is an elevational view of the fastener.
Figure 10:
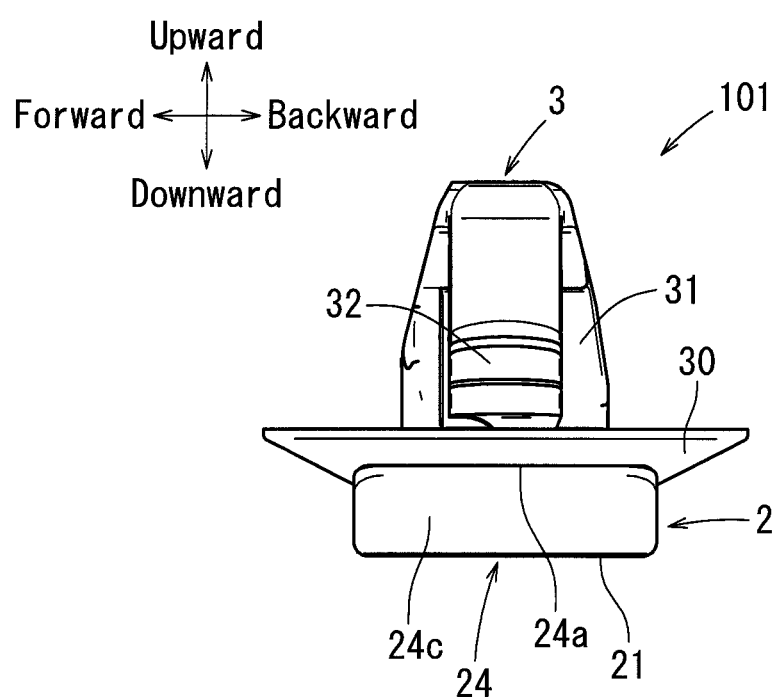
FIG. 10 is a side view of the fastener.

As shown in FIGS. 7 to 9, the opposite projecting portions 27 may respectively be positioned between the projecting portions 24 and the ribs 26. In particular, the opposite projecting portions 27 may respectively be positioned closely adjacent to the projecting portions 24. Similar to the projecting portions 24, the opposite projecting portions 27 may respectively extend over the entire width of the connecting base 2. As best shown in FIG. 9, the opposite projecting portions 27 may respectively oppositely project inward in the lateral (longitudinal) direction of the connecting base 2. The opposite projecting portions 27 may incline upward relative to the connecting base 2. Further, the opposite projecting portions 27 may respectively be tapered or reduced in thickness upward, so as to have thinned linear distal ends 27a directed upward and extending in the width direction of the connecting base 2. In particular, the opposite projecting portions 27 may respectively have lower (first) surfaces 27c continuous with the second surface 22 of the connecting base 2 and sloped upward toward the thinned distal ends 27a, and upper (second) surfaces 27b continuous with the upper surfaces 24b of the projecting portions 24 and sloped upward toward the thinned distal ends 27a. As a result, the opposite projecting portions 27 may have a pair of cutout or undercut portions 28 (which may be referred to as second undercut portions) formed therein/thereunder and generally defined by the lower surfaces 27c of the opposite projecting portions 27. Further, the undercut portions 28 may respectively extend over the entire width of the connecting base 2.

Similar to the first embodiment, the fastener 101 thus constructed may be connected to the wiring harness 40 using the adhesive tapes 50 in the same manner as the first embodiment. However, in this embodiment, the adhesive tapes 50 may be wrapped around the connecting base 2 and the wiring harness 40 in such a manner that both the projecting portions 24 and the opposite projecting portions 27 may be completely covered by the adhesive tapes 50.

According to the fastener 101 thus constructed, similar to the first embodiment, when the substantial lateral displacement force is produced between the fastener 101 and the wiring harness 40, the relative lateral displacement between the fastener 101 and the wiring harness 40 may be effectively avoided.

Conversely, when the excessively large lateral displacement force is produced between the fastener 101 and the wiring harness 40 during work, e.g., when the excessively large lateral displacement force is applied to the fastener 101 leftward relative to the wiring harness 40, the fastener 101 may be slid leftward along the wiring harness 40. This causes the left adhesive tape 50 covering the left projecting portion 24 (one of the projecting portions 24) and the left opposite projecting portion 27 (one of the opposite projecting portions 27) to be folded rightward around the distal end 24a of the left projecting portion 24. As a result, similar to the first embodiment, the folded left adhesive tape 50 may be partially caught in the undercut portion 25 formed in the left projecting portion 24 while the distal end 24a of the left projecting portion 24 may bite into the left adhesive tape 50. At the same time, the inner (adhesive) surface 52 of the left adhesive tape 50 caught in the undercut portion 25 may adhere to the lower surface 24c of the left projecting portion 24.

At this time, unlike the first embodiment, the right adhesive tape 50 covering the right projecting portion 24 (another of the projecting portions 24) and the right opposite projecting portion 27 (another of the opposite projecting portions 27) may be folded rightward around the thinned distal end 27a of the right opposite projecting portion 27. As a result, the folded right adhesive tape 50 may be partially caught in the undercut portion 28 formed in the right opposite projecting portion 27 while the distal end 27a of the right opposite projecting portion 27 may bite into the right adhesive tape 50. At the same time, the inner (adhesive) surface 52 of the right adhesive tape 50 caught in the undercut portion 28 may adhere to the lower surface 27c of the right opposite projecting portion 27.

As a result, the fastener 101 may further be effectively restricted from being excessively slid leftward along the wiring harness 40. Thus, the relative lateral displacement of the fastener 1 and the wiring harness 40 may be effectively minimized, even when the excessively large displacement force is produced between the fastener 101 and the wiring harness 40 during work.

Third Embodiment

A third detailed representative embodiment will now be described with reference to FIGS. 11 to 14. Further, because the third embodiment relates to the first embodiment, only the constructions and elements that are different from the first embodiment will be explained in detail. Elements that are the same in the first and third embodiments will be identified by the same reference numerals and a detailed description of such elements may be omitted.

In this embodiment, similar to the first embodiment, a fastener 201 may include the connecting base 2 and the anchor 3. However, unlike the first embodiment, the connecting base 2 of the fastener 201 may have a pair of modified tapered (first) projecting portions 224 instead of the projecting portions 24.

Figure 11:
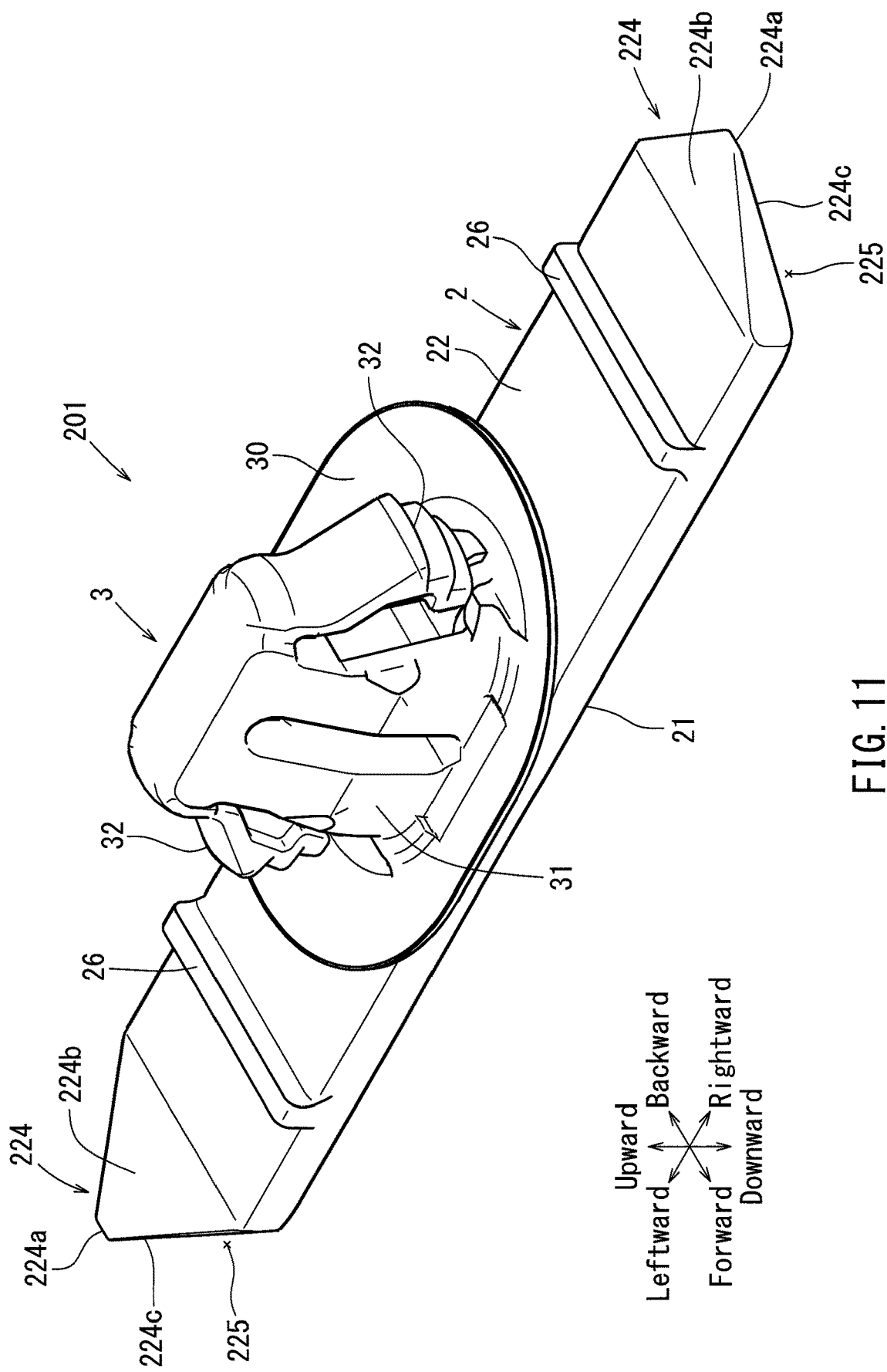
FIG. 11 is a perspective view of a fastener according to a third representative embodiment of the present disclosure, which is viewed from above.
Figure 12:
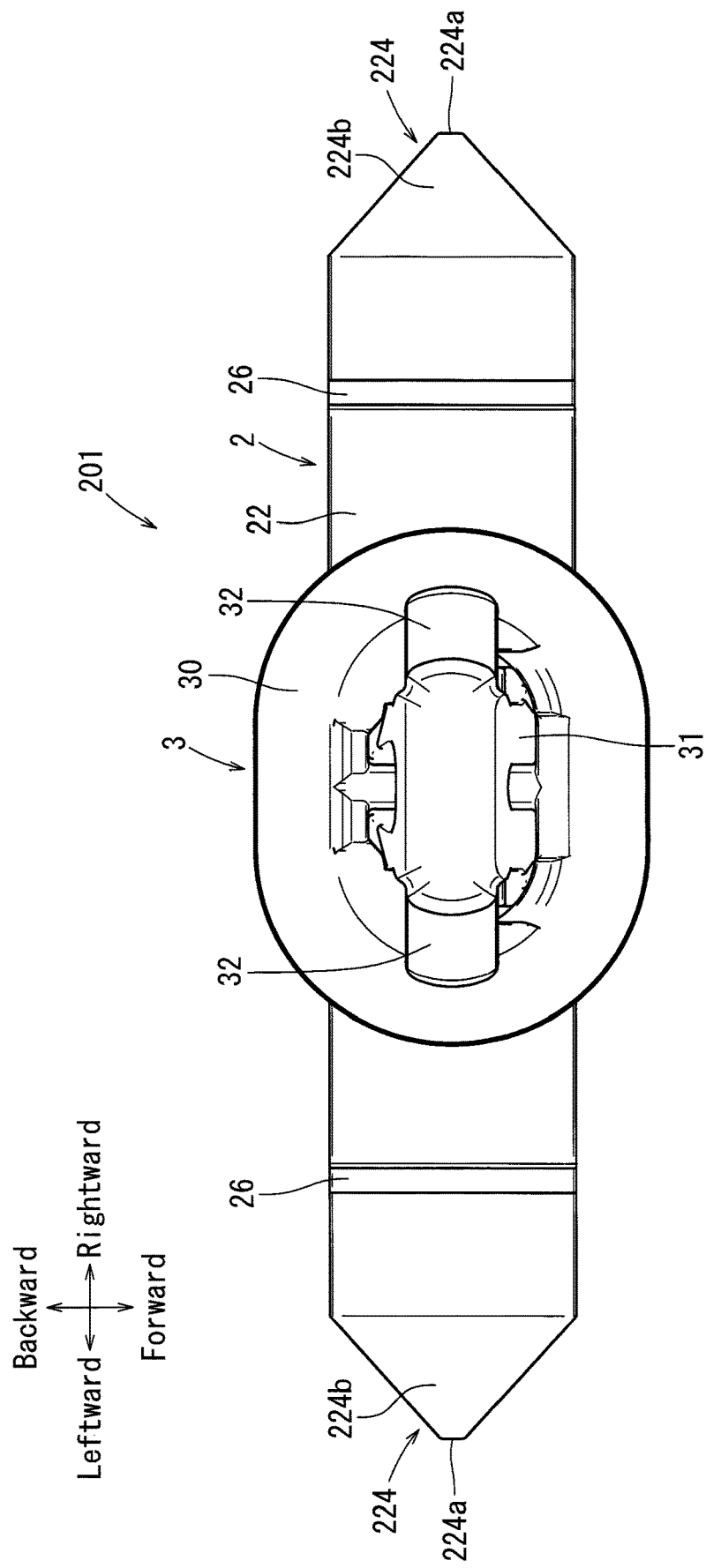
FIG. 12 is a plan view of the fastener.
Figure 13:
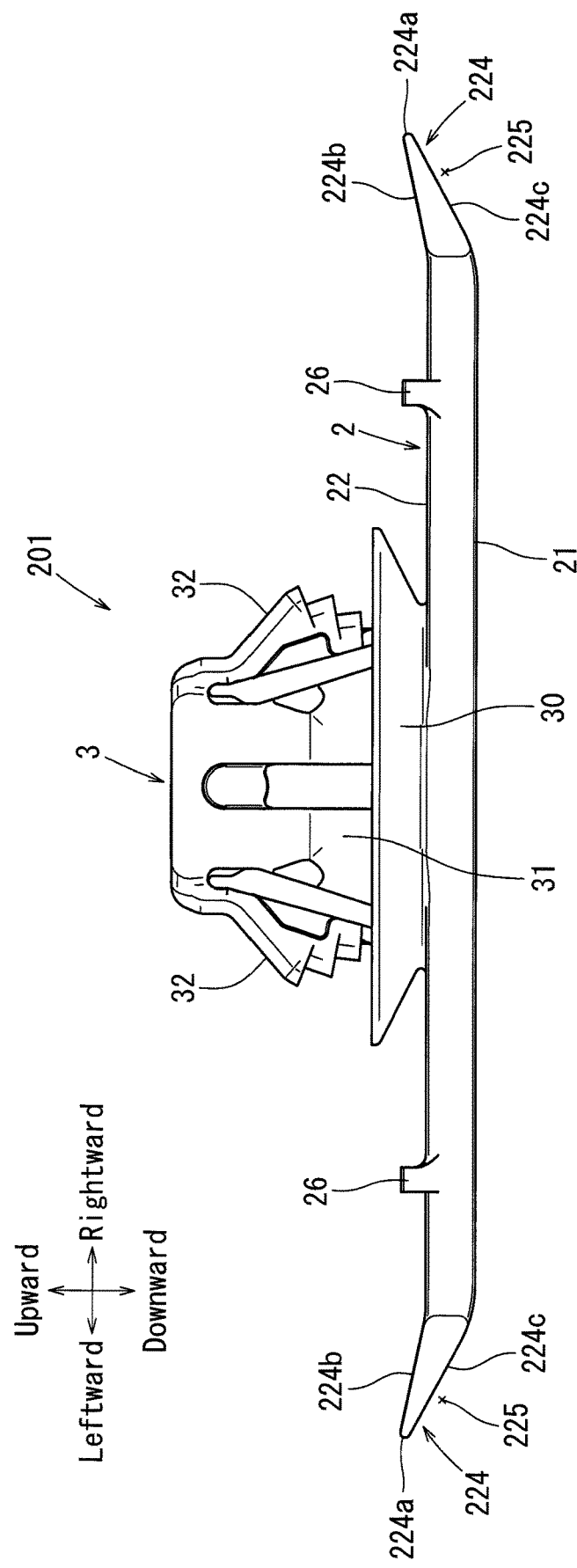
FIG. 13 is an elevational view of the fastener.
Figure 14:
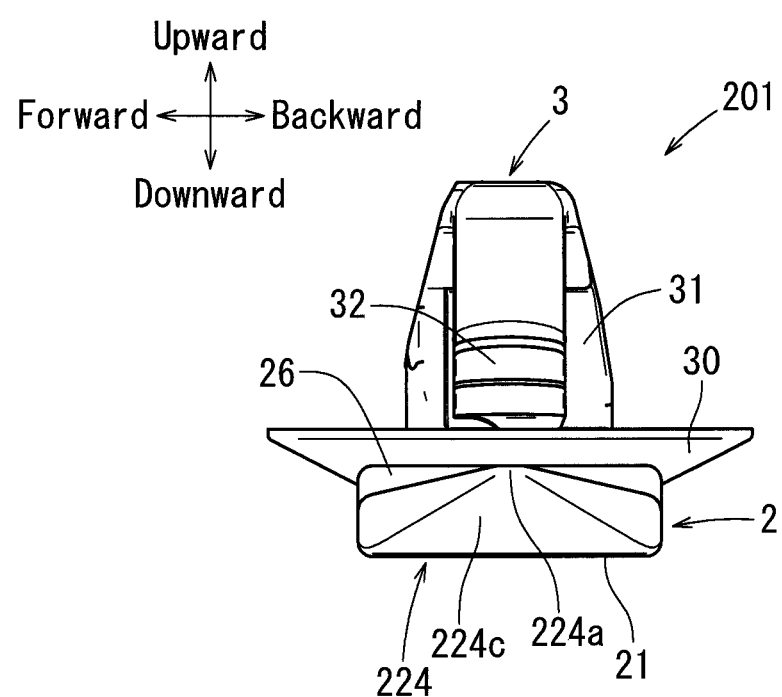
FIG. 14 is a side view of the fastener.

As shown in FIGS. 11 and 12, the projecting portions 224 may respectively have distal ends 224a, upper surfaces 224b, lower surfaces 224c and undercut portions 225, which respectively correspond to the distal ends 24a, the upper surfaces 24b, the lower surfaces 24c and the undercut portions 25 of the projecting portions 24 in the first embodiment. However, as best shown in FIG. 12, unlike the projecting portions 24 in the first embodiment, the projecting portions 224 may be gradually narrowed or reduced in width toward the distal ends 224a, so as to have a substantially triangular shape. As a result, the upper surfaces 224b and the lower surfaces 224c may respectively have a substantially triangular shape. Therefore, the distal ends 224a of the projecting portions 224 may respectively be shortened in width.

The projecting portions 224 thus shaped may have the substantially same function as the projecting portions 24 of the first embodiment. Therefore, the fastener 201 in this embodiment may have the substantially same function as the fastener 1 according to the first embodiment.

Fourth Embodiment

A fourth detailed representative embodiment will now be described with reference to FIGS. 15 to 18. Further, because the fourth embodiment relates to the first embodiment, only the constructions and elements that are different from the first embodiment will be explained in detail. Elements that are the same in the first and fourth embodiments will be identified by the same reference numerals and a detailed description of such elements may be omitted.

In this embodiment, similar to the first embodiment, a fastener 301 may include the connecting base 2 and the anchor 3. However, unlike the first embodiment, the connecting base 2 of the fastener 301 may have a pair of modified tapered (first) projecting portions 324 instead of the projecting portions 24.

Figure 15:
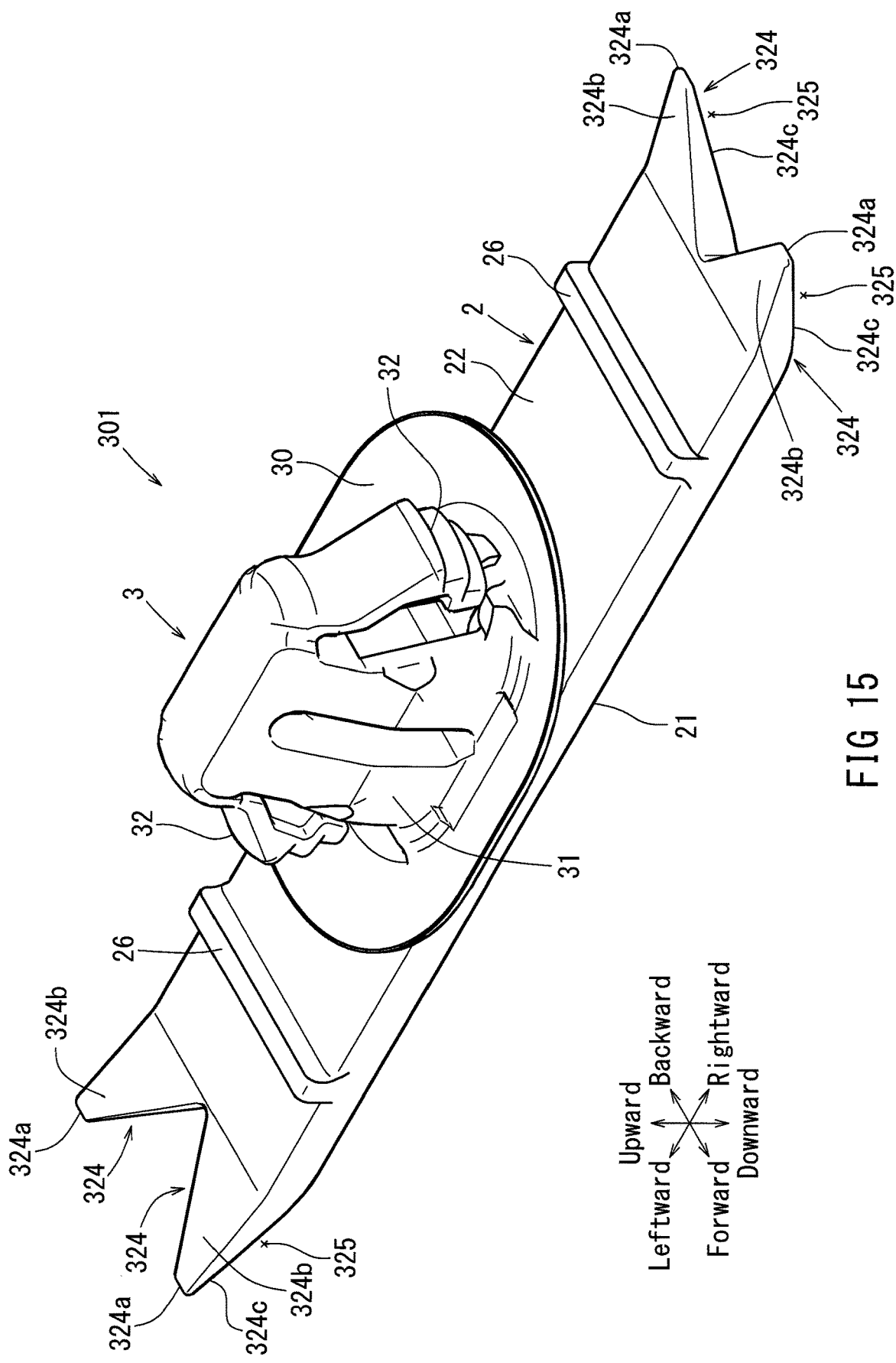
FIG. 15 is a perspective view of a fastener according to a fourth representative embodiment of the present disclosure, which is viewed from above.
Figure 16:
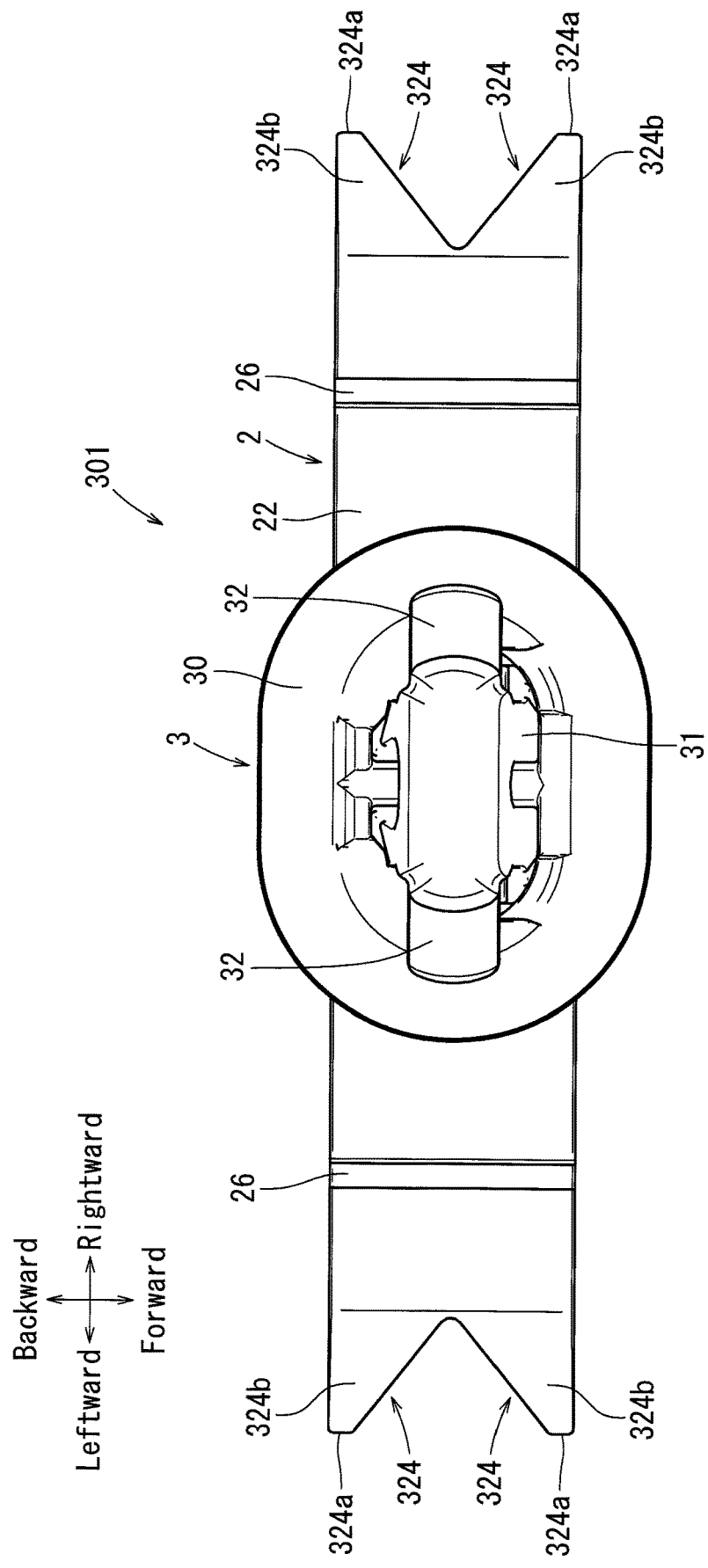
FIG. 16 is a plan view of the fastener.
Figure 17:
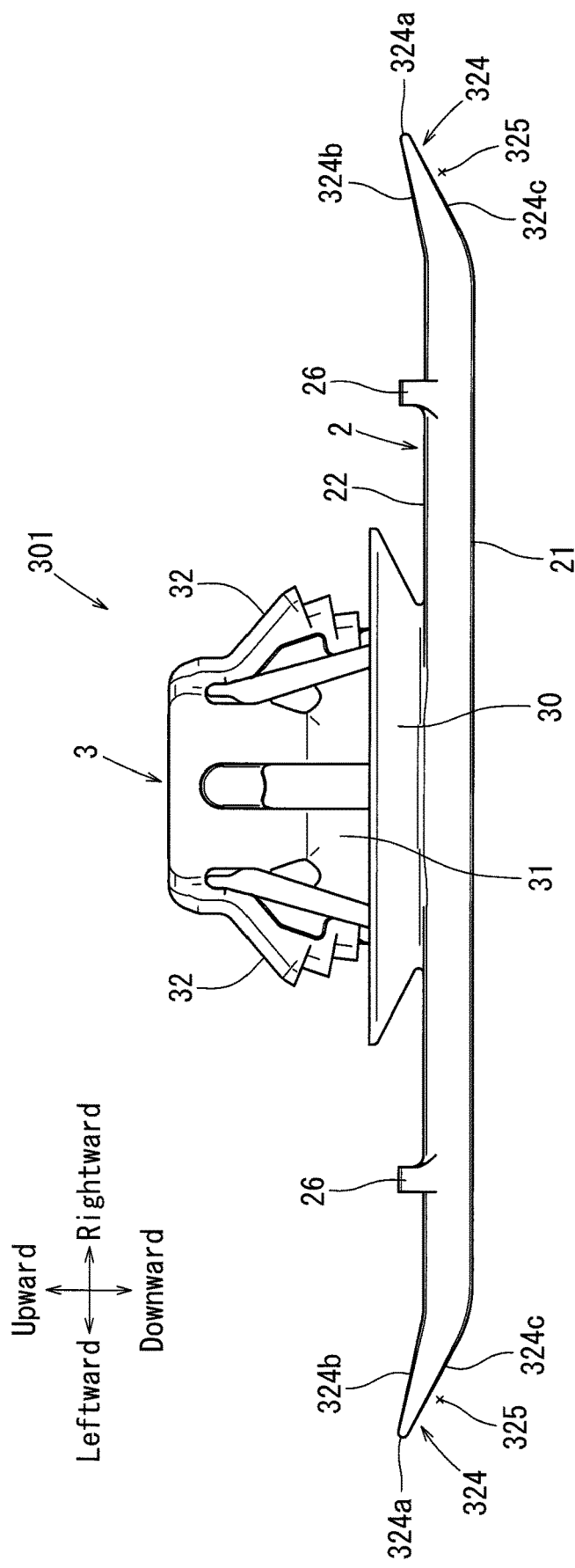
FIG. 17 is an elevational view of the fastener.
Figure 18:
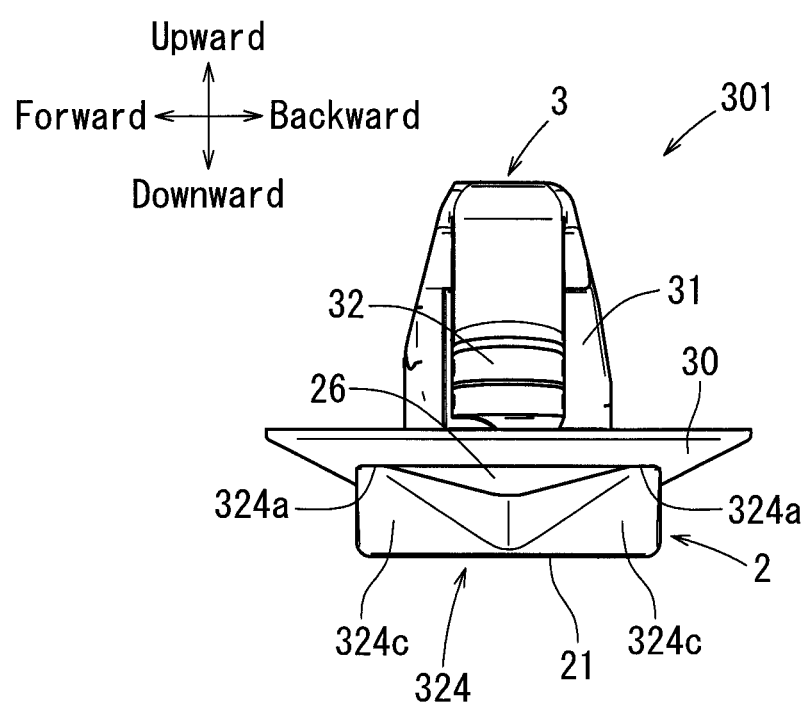
FIG. 18 is a side view of the fastener.
Figure 19:
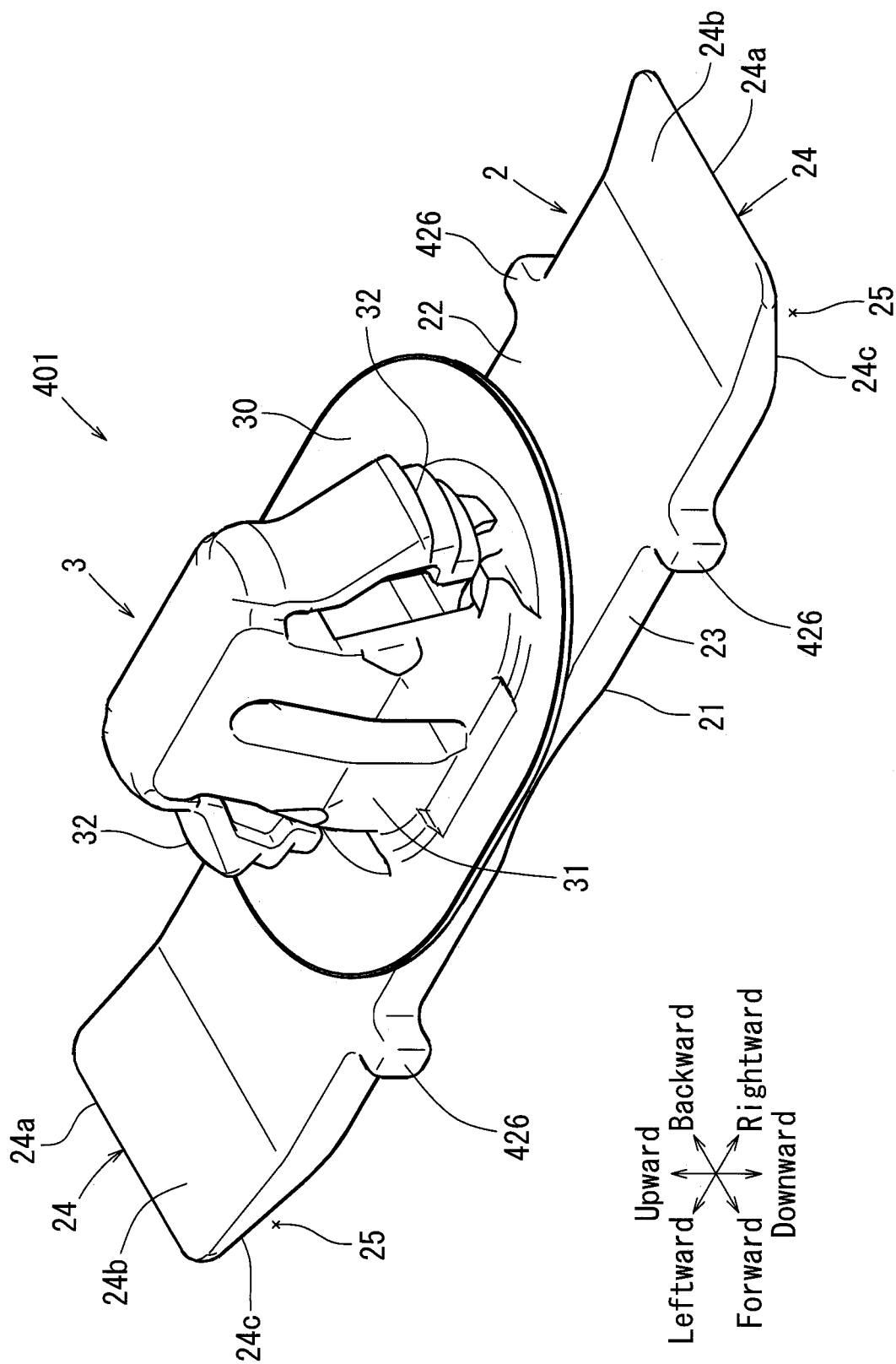
FIG. 19 is a perspective view of a fastener according to a fifth representative embodiment of the present disclosure, which is viewed from above.
Figure 20:
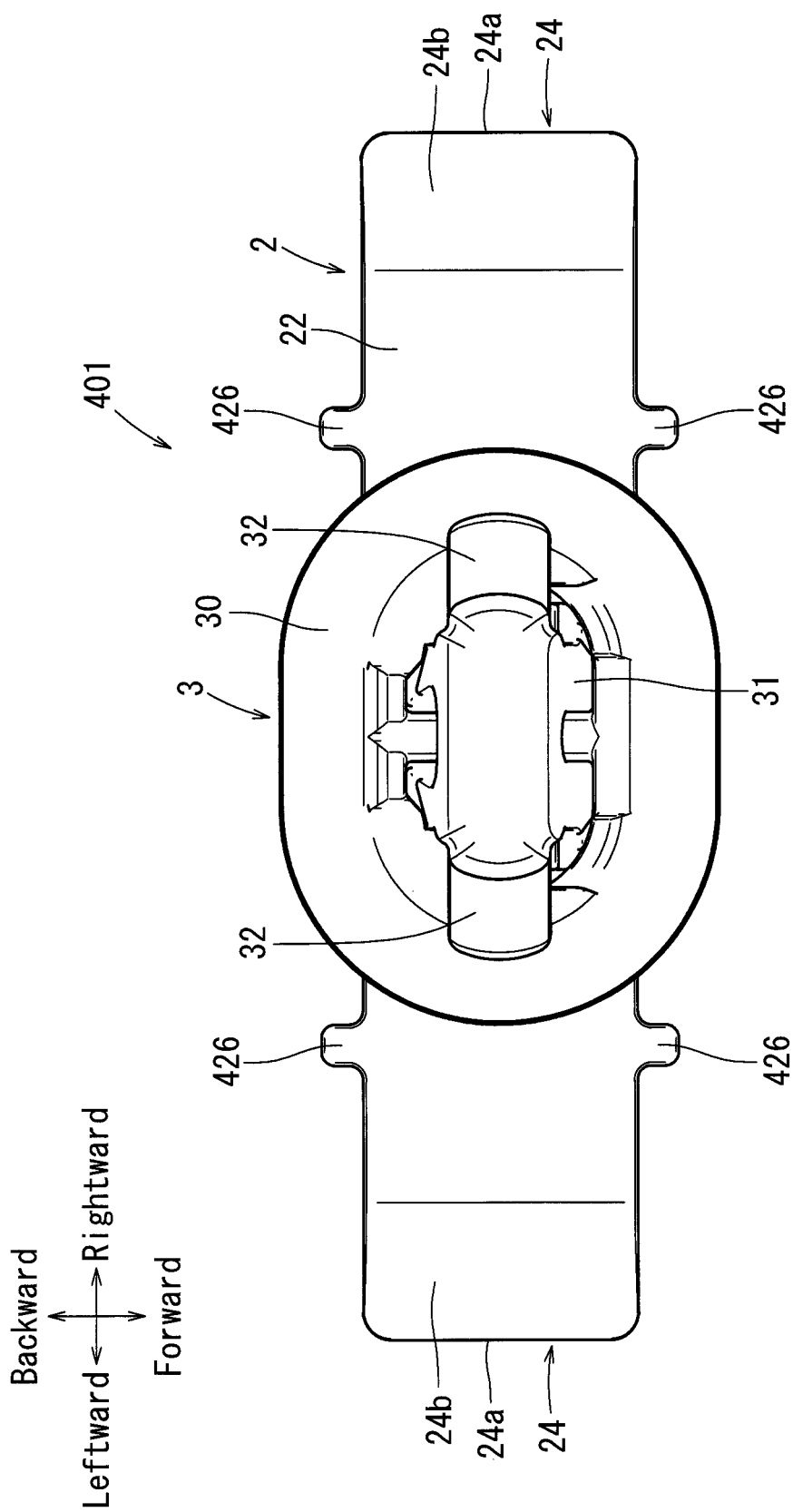
FIG. 20 is a plan view of the fastener.
Figure 21:
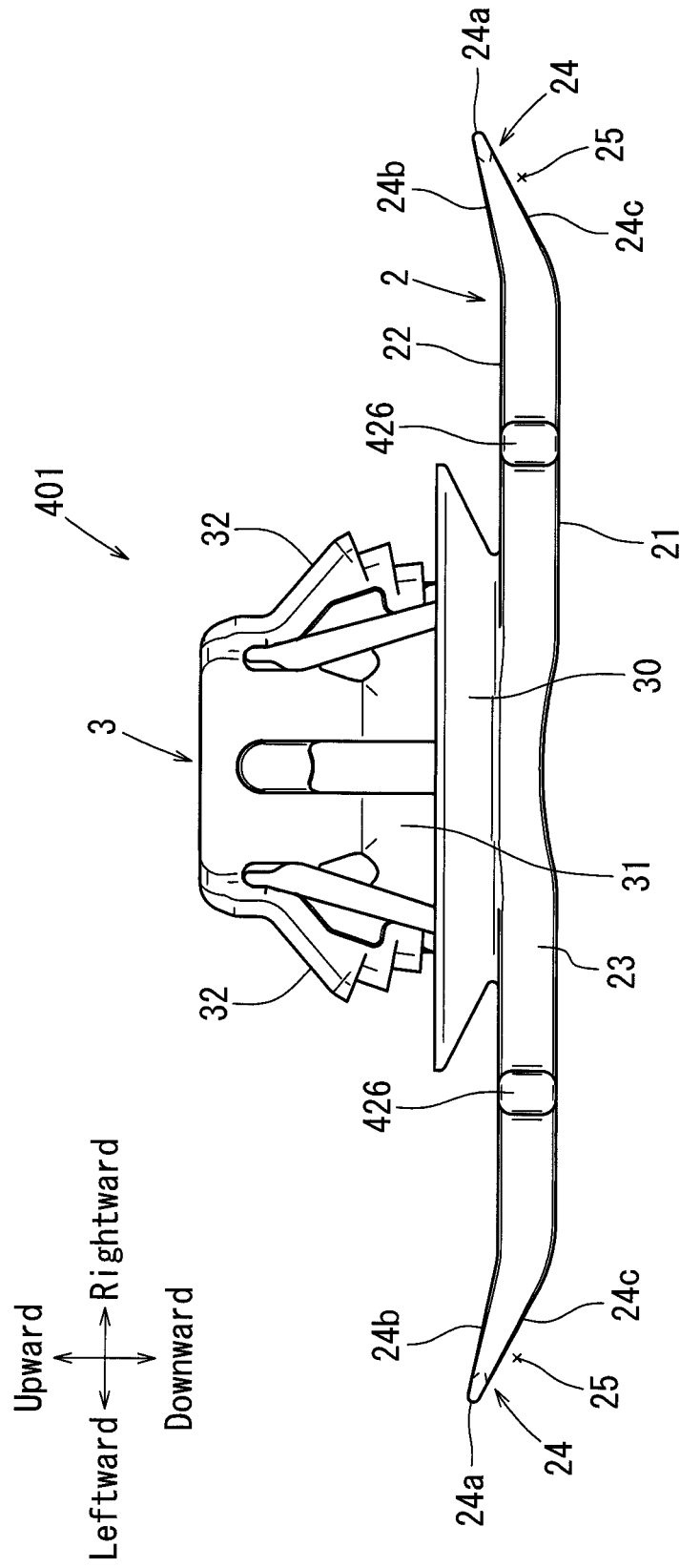
FIG. 21 is an elevational view of the fastener.
Figure 22:
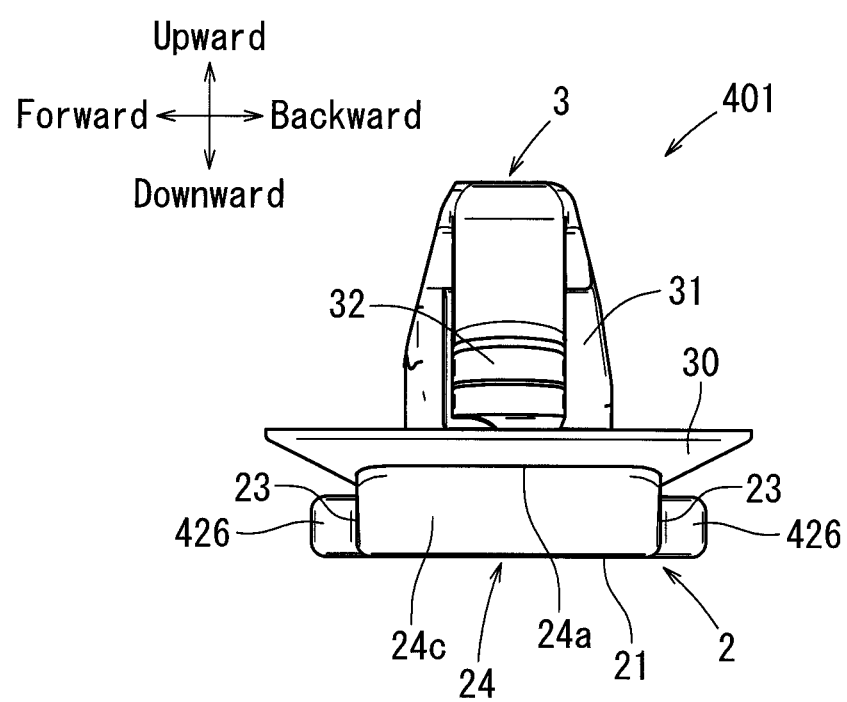
FIG. 22 is a side view of the fastener.

As best shown in FIGS. 15 and 16, the projecting portions 324 may respectively have distal ends 324a, upper surfaces 324b, lower surfaces 324c and undercut portions 325, which respectively correspond to the distal ends 24a, the upper surfaces 24b, the lower surfaces 24c and the undercut portions 25 in the first embodiment. However, as shown in FIG. 16, unlike the projecting portions 24 in the first embodiment, the projecting portions 324 may respectively be partially removed to form V-shaped central notches therein. That is, the projecting portions 324 may respectively be split into two symmetrical portions by the V-shaped central notches. As a result, the upper surfaces 324b and the lower surfaces 324c may respectively be split into two symmetrical portions. Therefore, the distal ends 324a of the projecting portions 324 may respectively be formed into two separated portions that are shortened in width as compared to the distal ends 24a of the projecting portions 24 in the first embodiment.

The projecting portions 324 thus shaped may have the substantially same function as the projecting portions 24 in the first embodiment. Therefore, the fastener 301 in this embodiment may have the substantially same function as the fastener 1 according to the first embodiment.

Fifth Embodiment

A fifth detailed representative embodiment will now be described with reference to FIGS. 19 to 22. Further, because the fifth embodiment relates to the first embodiment, only the constructions and elements that are different from the first embodiment will be explained in detail. Elements that are the same in the first and fifth embodiments will be identified by the same reference numerals and a detailed description of such elements may be omitted.

In this embodiment, similar to the first embodiment, a fastener 401 may include the connecting base 2 and the anchor 3. However, unlike the first embodiment, the connecting base 2 of the fastener 401 may have two (right and left) pairs of protrusions 426 instead of the single pair of ribs 26 in the first embodiment. Each pair of protrusions 426 may respectively be formed in (front and back) side surfaces 23 of the connecting base 2 so as to oppositely project in a width (front-back) direction of the connecting base 2.

The protrusions 426 thus formed may have the substantially same function as the ribs 26 in the first embodiment. Therefore, the fastener 401 in this embodiment may have the substantially same function as the fastener 1 according to the first embodiment. Further, the fastener 401 thus constructed may be more easily molded using a molding die. In addition, the design of the fastener 401 may be easily changed.

Sixth Embodiment

A sixth detailed representative embodiment will now be described with reference to FIGS. 23 to 27. Further, because the sixth embodiment relates to the second embodiment, only the constructions and elements that differ from the second embodiment will be explained in detail. Elements that are substantially the same in the second and sixth embodiments will be identified by the same reference numerals and a detailed description of such elements may be omitted.

In this embodiment, similar to the second embodiment, a fastener 501 may include the connecting base 2 and the anchor 3. However, in this embodiment, the connecting base 2 of the fastener 501 may have a pair of modified tapered (first) projecting portions 524 instead of the projecting portions 24, and a pair of modified tapered opposite (second) projecting portions 527 instead of the opposite projecting portions 27.

Figure 23:
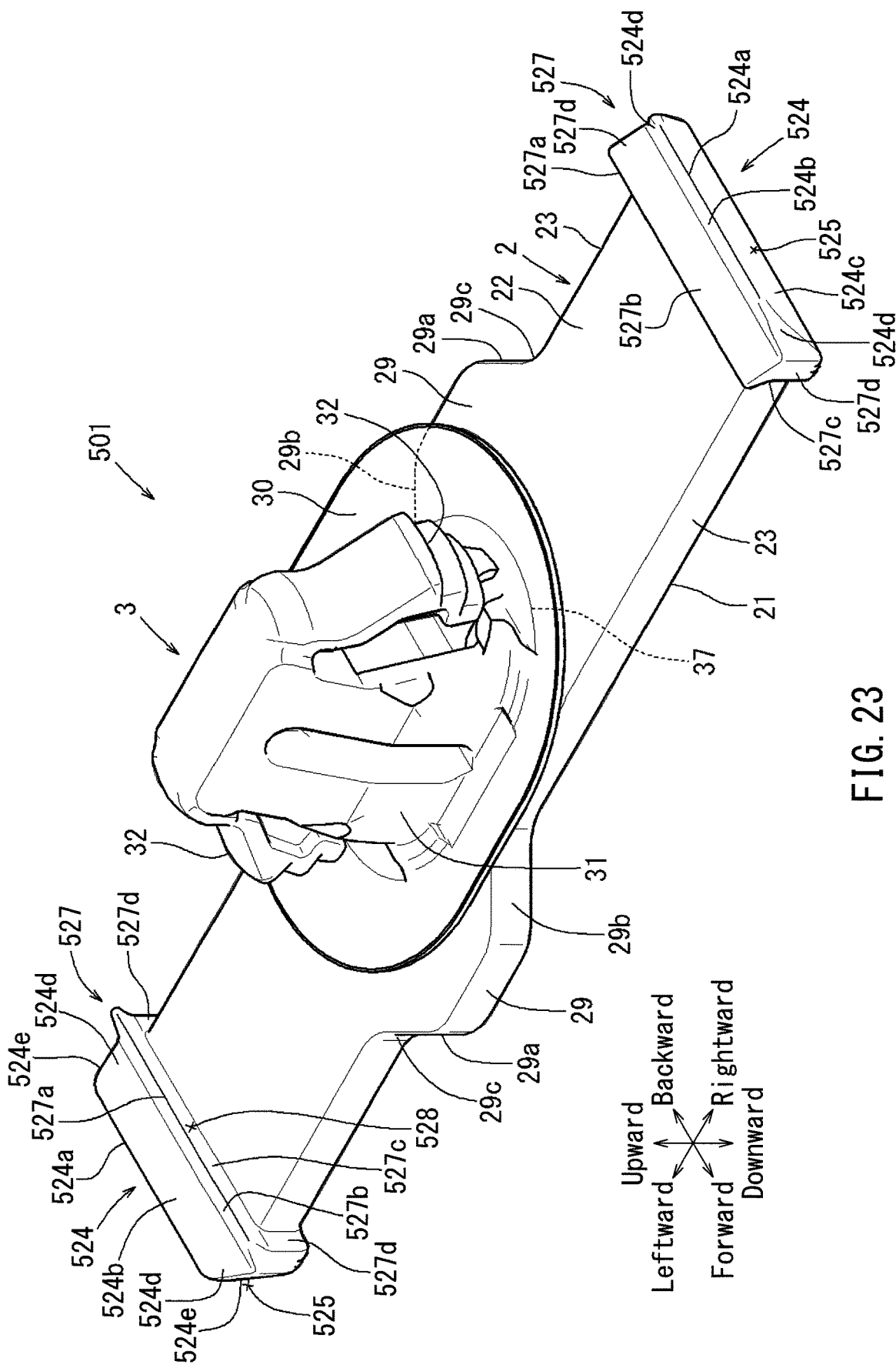
FIG. 23 is a perspective view of a fastener according to a sixth representative embodiment of the present disclosure, which is viewed from above.
Figure 24:
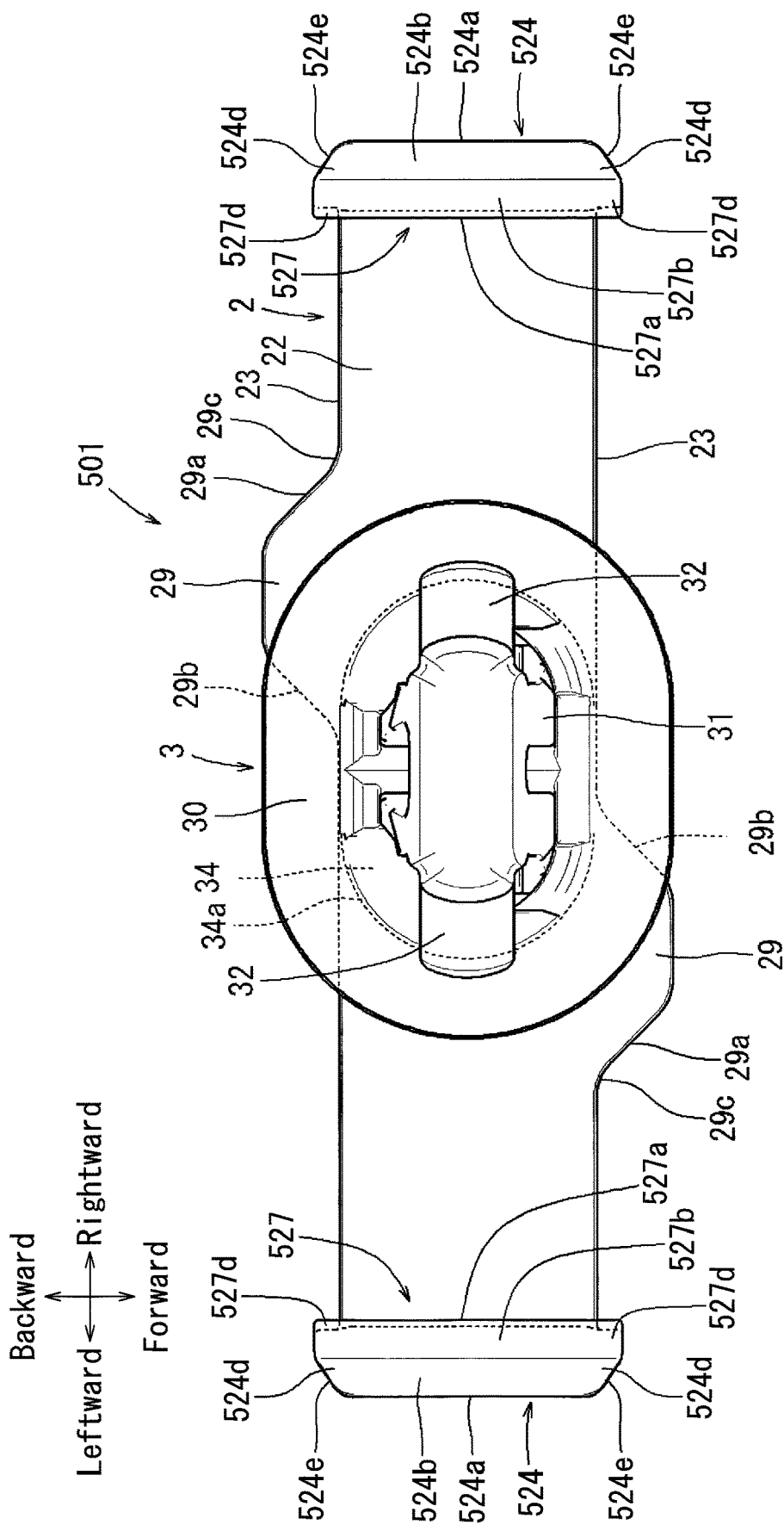
FIG. 24 is a plan view of the fastener.
Figure 25:
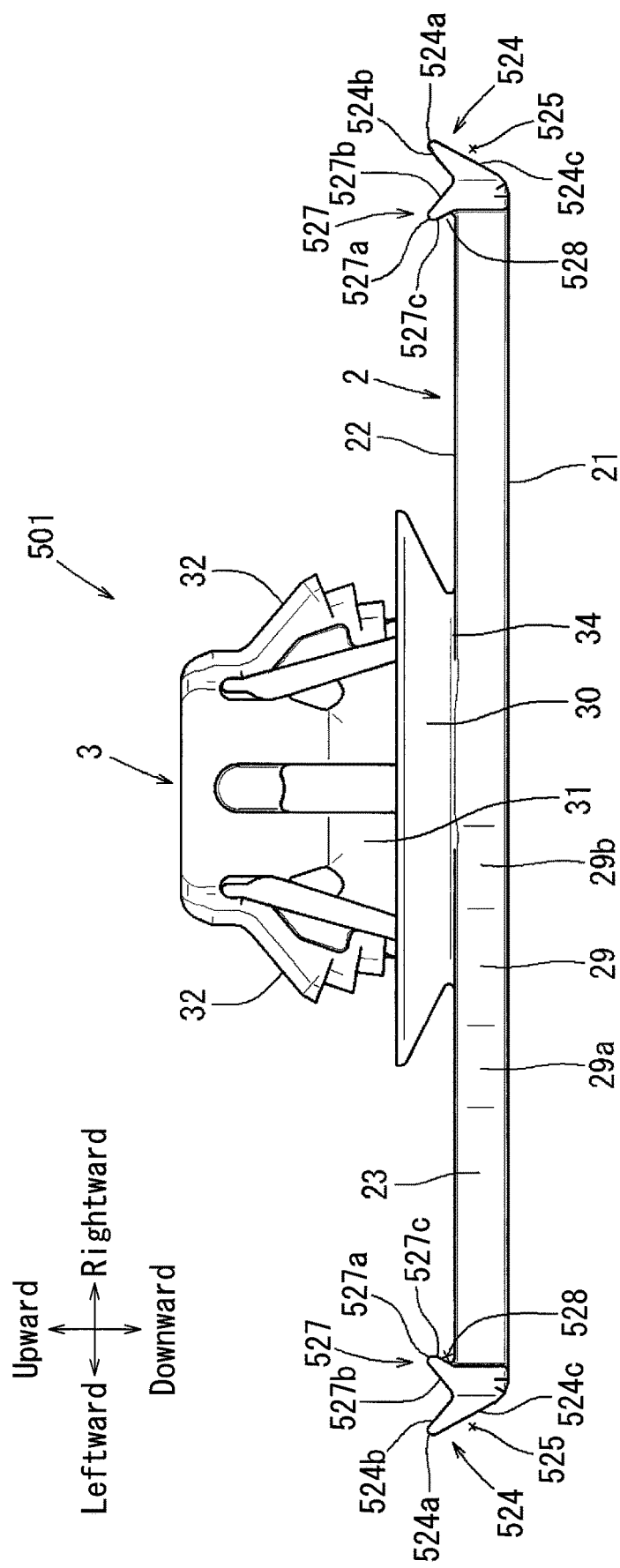
FIG. 25 is an elevational view of the fastener.
Figure 26:
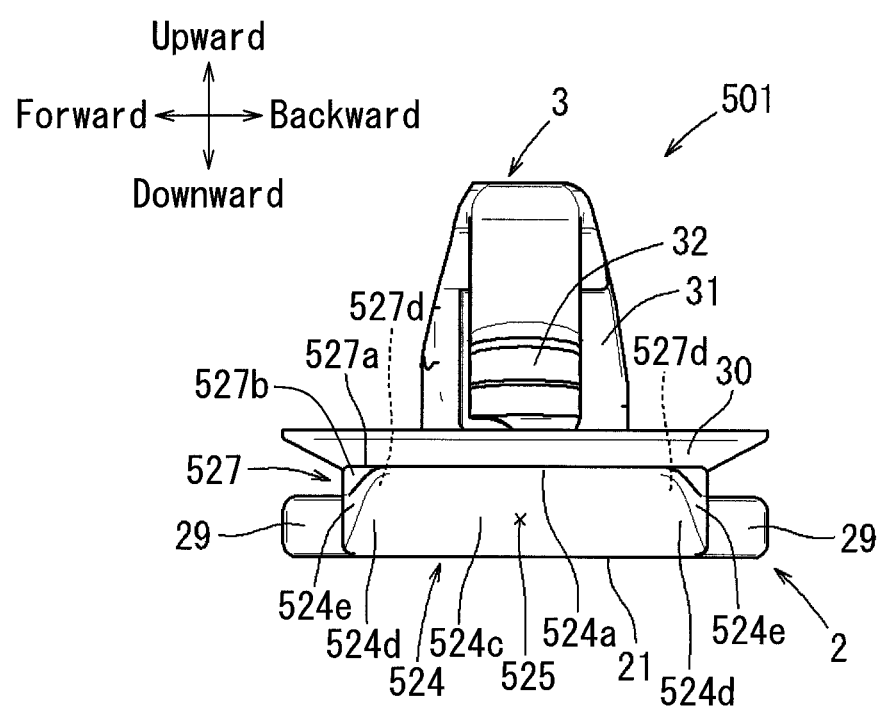
FIG. 26 is a side view of the fastener.

As shown in FIGS. 23 to 25, the projecting portions 524 may respectively have distal ends 524*a*, upper surfaces 524*b*, lower surfaces 524*c* and undercut portions 525, which respectively correspond to the distal ends 24*a*, the upper surfaces 24*b*, the lower surfaces 24*c* and the undercut portions 25 of the projecting portions 24 of the second embodiment. However, as shown in FIG. 24, the projecting portions 524 may respectively be widened or bulged relative to the connecting base 2 in the width direction of the connecting base 2, so as to have bulged ends 524*d* formed in both widthwise ends thereof. As a result, the distal ends 524*a*, the upper surfaces 524*b*, the lower surfaces 524*c* and the undercut portions 525 of the projecting portions 524 may respectively widened relative to the distal ends 24*a*, the upper surfaces 24*b*, the lower surfaces 24*c* and the undercut portions 25 of the projecting portions 24 of the second embodiment. Further, as shown in FIG. 24, the bulged ends 524*d* may respectively have side surfaces 524*e* that are sloped inward in the width direction of the connecting base 2.

Conversely, as shown in FIGS. 23 to 25, the opposite projecting portions 527 may respectively have distal ends 527*a*, upper surfaces 527*b*, lower surfaces 527*c* and undercut portions 528, which respectively correspond to the distal ends 27*a*, the upper surfaces 27*b*, the lower surfaces 27*c* and the undercut portions 28 of the opposite projecting portions 27 of the second embodiment. However, as shown in FIG. 24, the opposite projecting portions 527 may respectively be widened or bulged relative to the connecting base 2 in the width direction of the connecting base 2, so as to have bulged ends 527*d* formed in widthwise both ends thereof. As a result, the distal ends 527*a*, the upper surfaces 527*b*, the lower surfaces 527*c* and the undercut portions 528 of the opposite projecting portions 527 may respectively widened relative to the distal ends 27*a*, the upper surfaces 27*b*, the lower surfaces 27*c* and the undercut portions 28 of the opposite projecting portions 27 of the second embodiment.

As shown in FIGS. 23 to 25, in this embodiment, the connecting base 2 of the fastener 501 may have a pair of (front and back) protrusions 29 instead of the pair of ribs 26 in the second embodiment. The protrusions 29 may respectively be formed in the (front and back) side surfaces 23 of the connecting base 2 so as to oppositely project in the width (front-back) direction of the connecting base 2 (i.e., in a direction perpendicular to a lateral direction of the connecting base 2). As shown in FIG. 24, each of the projections 29 may have gently slanted side (right and left) surfaces 29*a* and 29*b* that are continuous with the side surfaces 23 of the connecting base 2.

As shown in FIG. 24, the protrusions 29 may be laterally (longitudinally) alternately positioned across the anchor 3 (the pillar 31). In particular, the projection 29 formed in the front side surface 23 may be positioned leftward relative to the anchor 3 whereas the projection 29 formed in the back side surface 23 may be positioned rightward relative to the anchor 3. Further, the protrusions 29 may respectively be positioned so as to partially (preferably by about half) overlap the base portion 34 of the anchor 3 in the width direction of the connecting base 2. In particular, the protrusions 29 may respectively be positioned such that portions thereof (e.g., portions including the side surfaces 29*b*) may overlap the base portion 34 of the anchor 3.

The projecting portions 524, the opposite projecting portions 527 and the protrusions 29 thus constructed may have the substantially same function as the projecting portions 24, the opposite projecting portions 27 and the ribs 26 of the second embodiment. Therefore, the fastener 501 in this embodiment may have the substantially same function as the fastener 101 according to the second embodiment.

Further, according to the fastener 501, when the adhesive tapes 50 are wrapped around the second surface 22 of the connecting base 2 in order to fix the connecting base 2 to the wiring harness 40, the adhesive tapes 50 may be wound around the bulged ends 524*d* of the projecting portions 524 and the bulged ends 527*d* of the opposite projecting portions 527. This may contribute to a reduction of the relative lateral displacement of the fastener 501 and the wiring harness 40 when the excessively large lateral displacement force is produced between the fastener 501 and the wiring harness 40 that are connected to each other.

Figure 27:
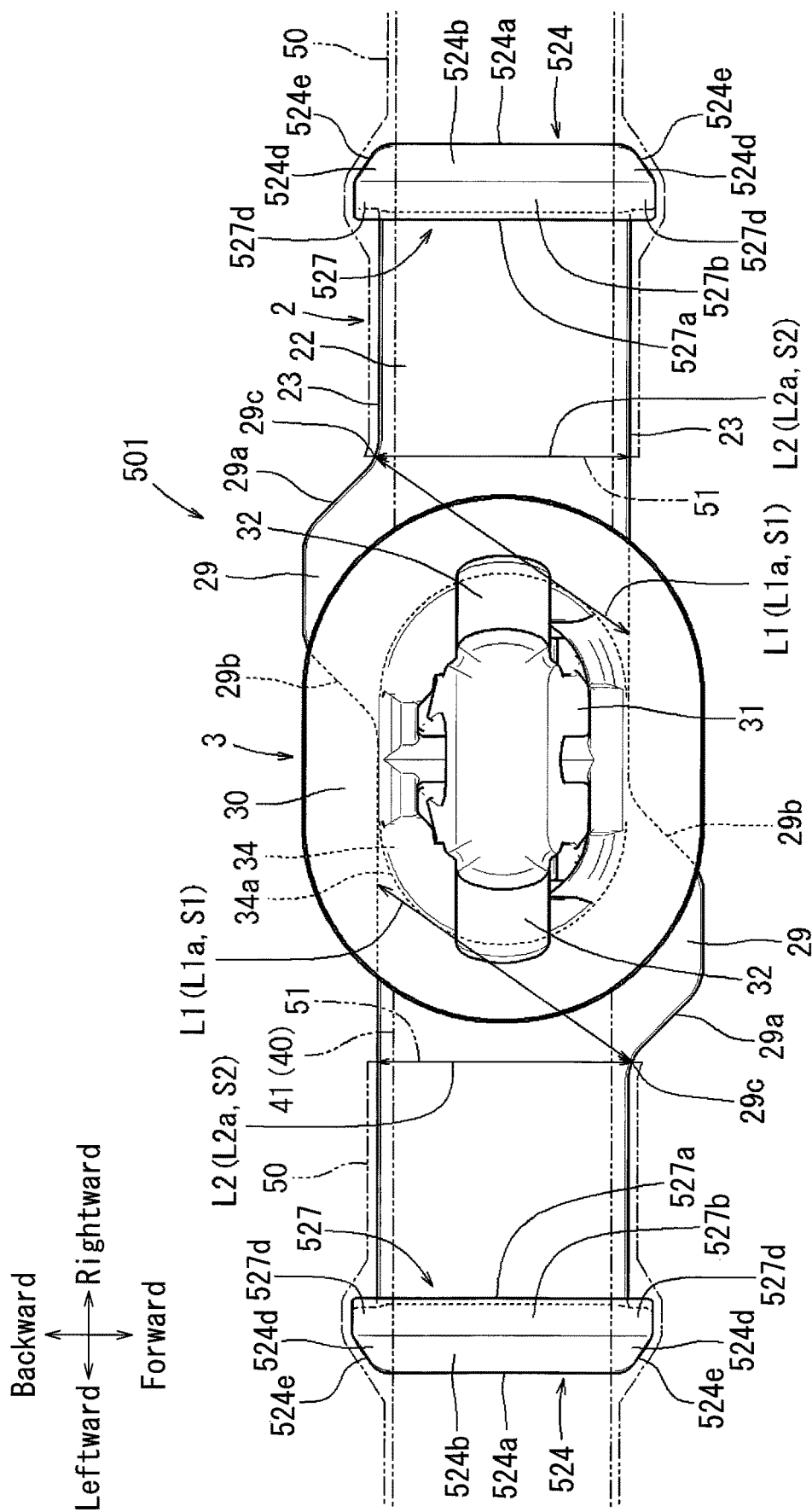
FIG. 27 is a plan view of the fastener, which illustrates a condition in which the fastener is connected to a wiring harness.
Figure 28:
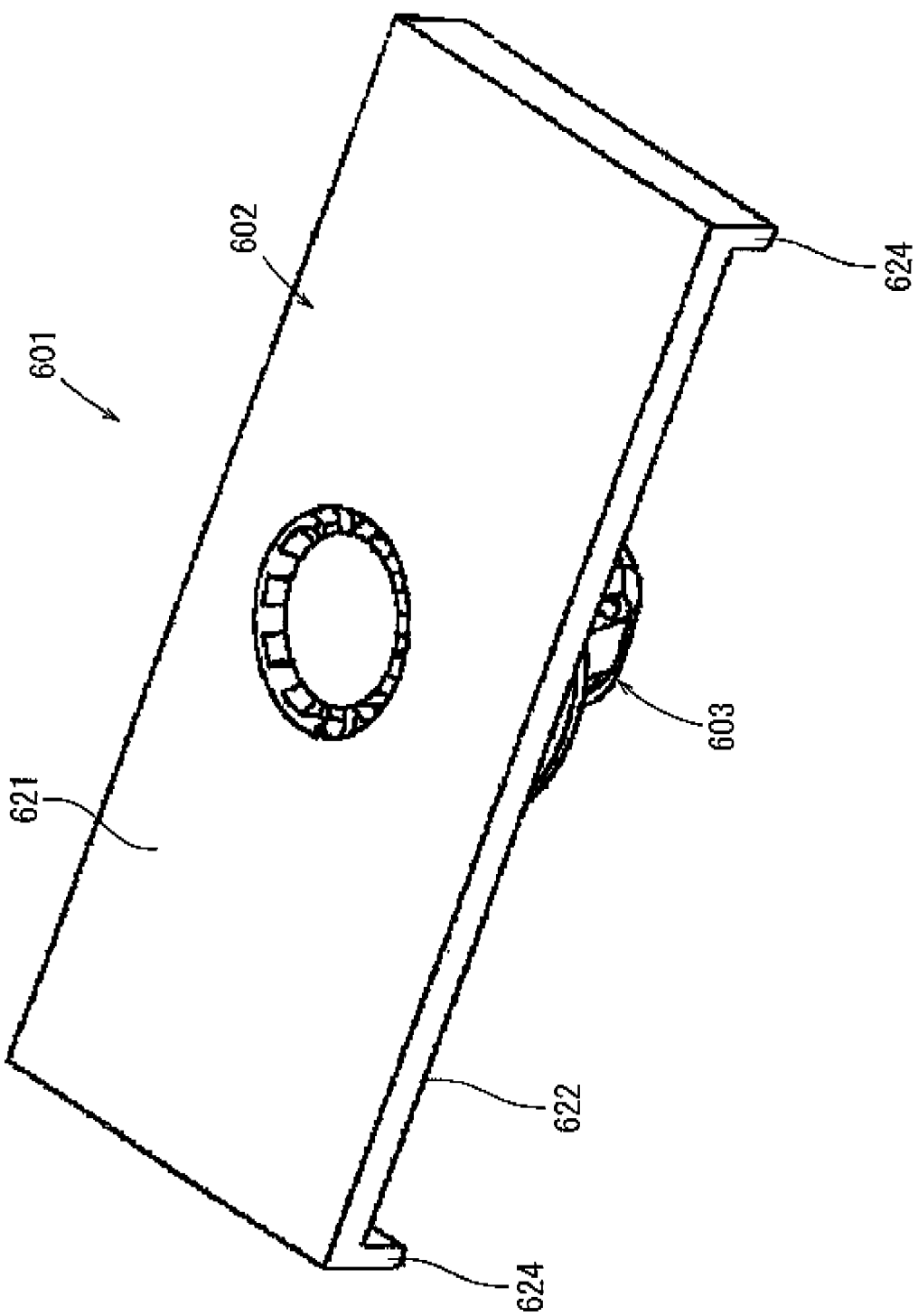
FIG. 28 is a perspective view of a conventional fastener, which is viewed from below.
Figure 29:
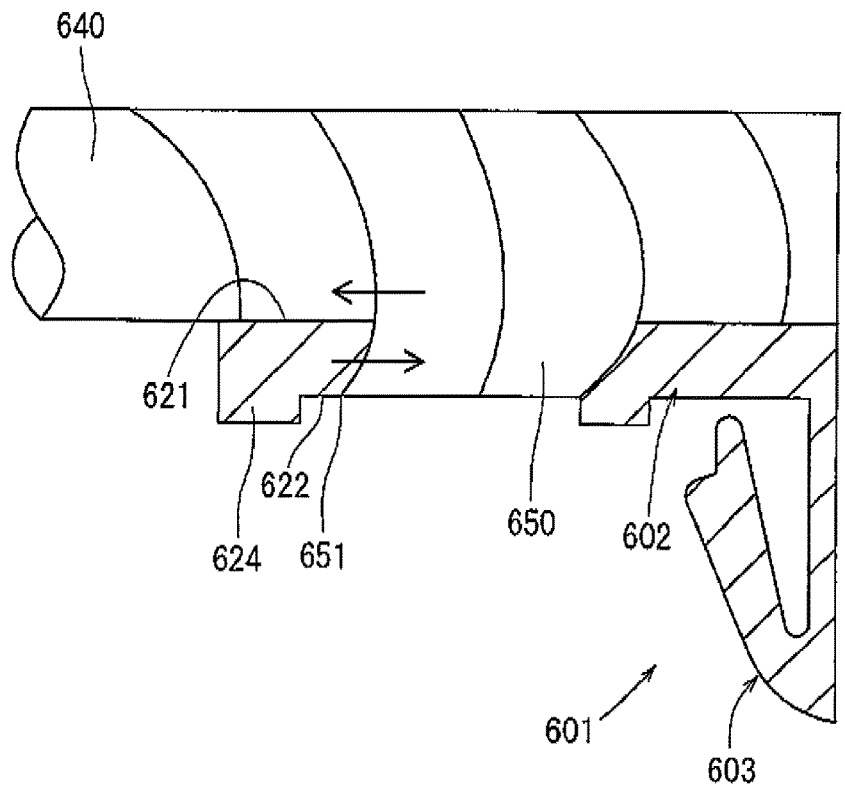
FIG. 29 is a partially vertical cross-sectional view of the fastener, which illustrates a condition in which the fastener is connected to a wiring harness.
Figure 30:
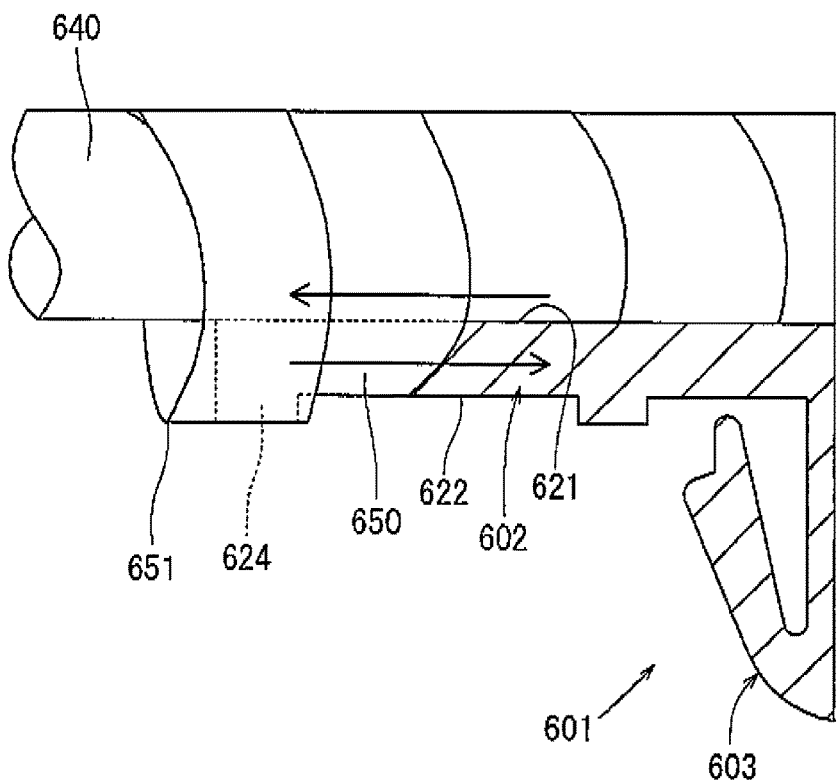
FIG. 30 is a partially vertical cross-sectional view of the fastener, which illustrates a condition in which an excessively large lateral displacement force is produced between the fastener and the wiring harness.

Further, when the wiring harness 40 attached to the vehicle body panel via the fastener 501 is subjected to an external (extraction) force in a direction in which the fastener 501 is removed away from the vehicle body panel, a bending load may be applied to the connecting base 2 of the fastener 501. As described above, the fastener 501 has the protrusions 29 formed in the side surfaces 23 of the connecting base 2. Therefore, the bending load may act on the connecting base 2 along (first) lines L1 (FIG. 27). The lines L1 may be determined as tangent lines to an outer circumference 34*a* of the anchor base portion 34 through base end points 29*c* of the side surfaces 29*a* of the protrusions 29, i.e., diagonal transversal lines that obliquely cross the connecting base 2.

However, if the connecting base 2 of the fastener 501 were not provided with the protrusions 29, i.e., when the connecting base 2 is provided with only the ribs 26 (as in the second embodiment), the bending load may act on the connecting base 2 along (second) lines L2 (FIG. 27). In such a case, the lines L2 may be simply determined as straight transversal lines that directly cross the connecting base 2 in the width direction.

As can be easily recognized, the first lines L1 may have a length L1*a* greater than a length L2*a* of the second lines L2 (L1*a*>L2*a*). That is, (first) sectional areas S1 of the connecting base 2 along the first lines L1 may be greater than (second) sectional areas S2 of the connecting base 2 along the second lines L2 (S1>S2). As a result, the connecting base 2 of the fastener 501 may have an increased resistance against the bending load applied thereto. Therefore, when the external force is applied to the wiring harness 40 attached to the vehicle body panel via the fastener 501, the connecting base 2 of the fastener 501 may be effectively prevented from being bent or broken. This means that the connecting base 2 does not need to have a large size in order to resist the bending load applied thereto.

Naturally, various changes and modifications may be made to the present disclosure without departing from the scope of the disclosure. For example, the shape and arrangement of the first projecting portions 24, 224, 324 and 524 and the second projecting portions 27 and 527 may be changed as necessary. Further, in the second embodiment (the fastener 101), the first projecting portions 24 may be omitted as necessary. Further, in the sixth embodiment (the fastener 501), the front projection 29 formed in the front side surface 23 of the connecting base 2 may be positioned rightward relative to the anchor 3 while the back projection 29 formed in the back side surface 23 of the connecting base 2 may be positioned leftward relative to the anchor 3.

Representative examples of the present disclosure have been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detail description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. A fastener comprising a plate-shaped connecting base having a first surface to be brought into contact with an outer circumferential surface of a cabling member and a second surface to be wrapped with band-like members, wherein the connecting base is configured to be fixed to the cabling member by applying the connecting base to the cabling member with the first surface brought into contact with the outer circumferential surface of the cabling member and by wrapping the band-like members around the second surface and the outer circumferential surface of the cabling member, wherein the connecting base has a first projecting portion formed therein and configured to be covered by the band-like member, wherein the first projecting portion has a first inclined surface continuous with and sloped relative to the first surface and a second inclined surface continuous with and sloped relative to the second surface, wherein the first projecting portion is formed into a wedge shape by the first and second inclined surfaces and has an undercut portion defined by the first inclined surface; and wherein the undercut portion is configured such that when a lateral displacement force is produced between the connecting base and the cabling member in a condition in which the connecting base is fixed to the cabling member by the band-like members, the band-like member covering the first projecting portion is partially caught therein.

2. The fastener as defined in claim 1, wherein the first projecting portion is projected outward in a lateral direction of the connecting base.

3. The fastener as defined in claim 1, wherein the connecting base has a second projecting portion formed therein and having a first inclined surface continuous with the second surface and a second inclined surface continuous with the second inclined surface of the first projecting portion, wherein the second projecting portion is formed into a wedge shape by its first and second inclined surfaces and has an undercut portion defined by its first inclined surface, and wherein the second projecting portion is projected inward in a lateral direction of the connecting base.

4. The fastener as defined in claim 1, wherein the first projecting portion is gradually narrowed in width toward a distal end thereof.

5. The fastener as defined in claim 3, wherein the first projecting portion and the second projecting portion are bulged relative to the connecting base in a width direction of the connecting base.

6. The fastener as defined in claim 1, wherein the connecting base has an anchor integrated therewith via a base portion and configured to be inserted into an attaching hole formed in a panel, wherein the connecting base has a pair of protrusions respectively formed in front and back surfaces thereof and oppositely projecting in a direction perpendicular to a lateral direction of the connecting base, and wherein the protrusions are laterally alternately positioned across the anchor so as to partially overlap the base portion of the anchor in a width direction of the connecting base.

7. A fastener comprising:

a plate-shaped connecting base;

at least one pair of projecting portions respectively formed in the connecting base; and undercut portions formed in the at least one pair of projecting portions, wherein the at least one pair of projecting portions oppositely project in a lateral direction of the connecting base, wherein the at least one pair of projecting portions respectively have first inclined surfaces and second inclined surfaces sloped toward distal ends thereof, wherein each of the at least one pair of projecting portions is formed into a wedge shape by the first and second inclined surfaces thereof, and wherein the undercut portions are defined by the first inclined surfaces of the at least one pair of projecting portions.

8. The fastener as defined in claim 7, wherein the at least one pair of projecting portions comprise a single pair of projecting portions, and wherein the single pair of projecting portions are respectively formed in lateral end peripheries of the connecting base, so as to be projected outward.

9. The fastener as defined in claim 7, wherein the at least one pair of projecting portions comprise a first pair of projecting portions and a second pair of projecting portions, wherein the first pair of projecting portions are respectively formed in lateral end peripheries of the connecting base, so as to be projected outward, and wherein the second pair of projecting portions are respectively formed in the lateral end peripheries of the connecting base, so as to be projected inward.

10. The fastener as defined in claim 8, wherein the single pair of projecting portions are respectively reduced in width toward the distal ends thereof.

11. The fastener as defined in claim 8, wherein the single pair of projecting portions are respectively split into two portions in a width direction.

12. The fastener as defined in claim 9, wherein each pair of projecting portions respectively have bulged portions that are formed in opposing ends thereof.

* * * * *